(12) United States Patent
Wang et al.

(10) Patent No.: US 10,267,961 B2
(45) Date of Patent: Apr. 23, 2019

(54) DISPLAY DEVICE

(71) Applicant: BOE TECHNOLOGY GROUP CO., LTD., Beijing (CN)

(72) Inventors: Wei Wang, Beijing (CN); Yafeng Yang, Beijing (CN); Xiaochuan Chen, Beijing (CN); Jifeng Tan, Beijing (CN); Jian Gao, Beijing (CN); Can Wang, Beijing (CN); Xinli Ma, Beijing (CN); Can Zhang, Beijing (CN); Qian Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 61 days.

(21) Appl. No.: 15/568,068

(22) PCT Filed: Apr. 28, 2017

(86) PCT No.: PCT/CN2017/082387
§ 371 (c)(1),
(2) Date: Oct. 20, 2017

(87) PCT Pub. No.: WO2017/219760
PCT Pub. Date: Dec. 28, 2017

(65) Prior Publication Data
US 2018/0217306 A1    Aug. 2, 2018

(30) Foreign Application Priority Data

Jun. 24, 2016    (CN) .......................... 2016 1 0475899

(51) Int. Cl.
*G02B 5/18*     (2006.01)
*G02F 1/1335*   (2006.01)
*G02B 5/20*     (2006.01)

(52) U.S. Cl.
CPC ......... *G02B 5/1819* (2013.01); *G02B 5/1842* (2013.01); *G02B 5/1871* (2013.01);
(Continued)

(58) Field of Classification Search
CPC ........................... G02B 5/1871; G02B 6/0068
(Continued)

(56) References Cited

U.S. PATENT DOCUMENTS

| 7,714,368 | B2 * | 5/2010 | Yang | G02B 5/1871 |
| | | | | 257/291 |
| 9,759,856 | B2 * | 9/2017 | Jung | G02B 6/0068 |
| 2015/0138486 | A1 | 5/2015 | Lee | |

FOREIGN PATENT DOCUMENTS

| CN | 205722621 U | 11/2016 |
| CN | 205750203 U | 11/2016 |

OTHER PUBLICATIONS

Search Report for International Patent Application No. PCT/CN2017/082387 dated Jul. 24, 2017.

* cited by examiner

*Primary Examiner* — Audrey Y Chang
(74) *Attorney, Agent, or Firm* — Calfee, Halter & Griswold LLP

(57) ABSTRACT

A display device includes a display panel and a grating layer inside or outside the display panel. The display panel includes R pixels, G pixels and B pixels. The grating layer includes a R grating region, a G grating region and a B grating region; along a direction from a center of a central area of the view field of the display device to a non-central area of the view field, each of grating periods of the R, G and B grating regions gradually decreases; and lights emitted from positions of the display device corresponding to the R pixel, the G pixel and the B pixel are emitted respectively along straight lines formed by the position of the R pixel and (Continued)

the viewer, formed by the position of the G pixel and the viewer and formed by the position of the B pixel and the viewer.

20 Claims, 11 Drawing Sheets

(52) U.S. Cl.
CPC ........... *G02B 5/201* (2013.01); *G02F 1/1335* (2013.01); *G02F 1/133504* (2013.01); *G02F 2201/52* (2013.01)

(58) Field of Classification Search
USPC .................................. 359/569, 567; 257/291
See application file for complete search history.

DISPLAY DEVICE

CROSS-REFERENCE TO RELATED APPLICATIONS

The present application is based upon International Application No. PCT/CN2017/082387, filed on Apr. 28, 2017, which is based upon and claims priority to Chinese Patent Application No. 201610475899.1, titled "DISPLAY DEVICE" filed on Jun. 24, 2016, the entire contents of which are incorporated herein by reference.

TECHNICAL FIELD

The present disclosure relates to the field of display technology, and more particularly, to a display device.

BACKGROUND

A display device is a device for displaying a frame such as a text, a numeral, a symbol, a picture, or an image formed by combination of at least two of a text, a numeral, a symbol, a picture. The display device may be a flat display device, a curved surface display device, a 3D display device, a near eye display device, an AR/VR display device, and the like.

With the development of display devices, there is an increasingly high requirement on on-spot effect and viewer's sense of immersion. In order to improve the on-spot effect and viewer's sense of immersion, one of the key technology is for effective control of propagation of light within the display device. For example, a display device for performing a virtual display has a fixed central area of the view field and a non-central area of the view field. When a viewer is located within the viewing area before the display device and watches a frame displayed by the display device, the viewer's sight is focused on the central area of the view field. Propagation of light within the display device is controlled such that the viewer sees the frame as if it were projected on a virtual screen in front of the display device or behind the display device, and also the viewer can see the frame in both of the central area of the view field and the non-central area of the view field. Therefore, the display device may have a good on-spot effect and may improve the viewer's sense of immersion.

At present, generally, a microprism or a microlens may be provided to the display device, to realize the control of the propagation of light in the display device. That is, the conventional display device generally utilizes a structure based on geometrical optics principle to achieve control of the propagation of light in the display device. However, with the development of virtual display devices, structure based on geometrical optics principle is not sufficient to satisfy the requirement for control of the propagation of light within the display device, resulting in poor on-spot effect in the display performed by display device and poor sense of immersion for the viewer, thus bring a bad viewing experience for the viewer.

SUMMARY

Embodiments of the present disclosure relate to a display device.

A display device includes a display panel and a grating layer disposed inside the display panel or outside the display panel, wherein the display panel includes a plurality of R pixels, a plurality of G pixels and a plurality of B pixels. The grating layer includes a R grating region corresponding to the R pixel, a G grating region corresponding to the G pixel, and a B grating region corresponding to the B pixel.

Along a direction from a center of a central area of the view field of the display device to a non-central area of the view field of the display device, each of a grating period of the R grating region, a grating period of the G grating region, and a grating period of the B grating region gradually decreases; and light emitted from a position of the display device corresponding to the R pixel, light emitted from a position of the display device corresponding to the G pixel and light emitted from a position of the display device corresponding to the B pixel are emitted respectively along a straight line formed by the position of the R pixel and the viewer, a straight line formed by the position of the G pixel and the viewer and a straight line formed by the position of the B pixel and the viewer.

BRIEF DESCRIPTION OF THE DRAWINGS

The accompanying drawings, which are illustrated herein, provide a further understanding of the present disclosure and form a part of this disclosure. The illustrative embodiments of the present disclosure and its description are intended to be illustrative of the present disclosure and do not constitute an undue limitation to the present disclosure. In the drawings.

DETAILED DESCRIPTION

In order to further illustrate the display device provided in the embodiments of the present disclosure, the following description will be made in detail with reference to the accompanying drawings.

Figure 1:
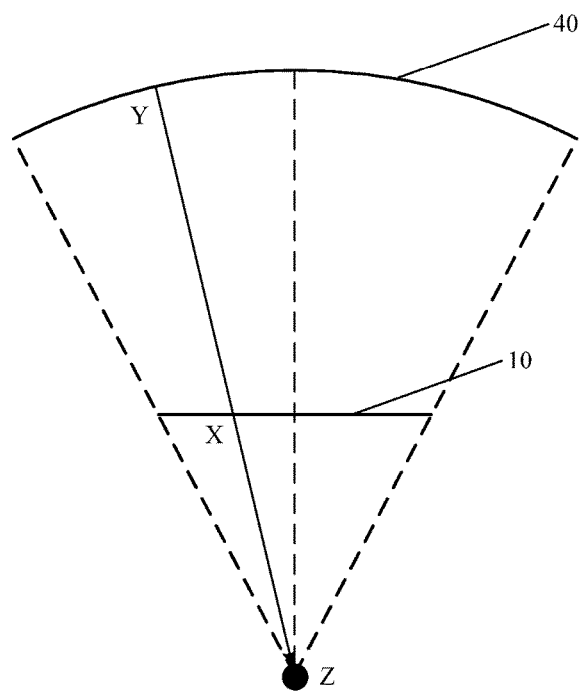
FIG. 1 is a diagram illustrating a positional relationship between a display device and a viewer.
Figure 2:
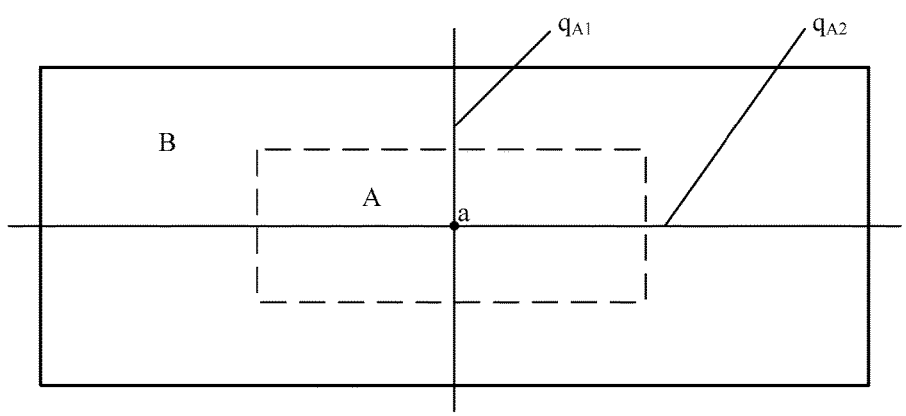
FIG. 2 is a schematic plan view illustrating the display device shown in FIG. 1.
Figure 3:
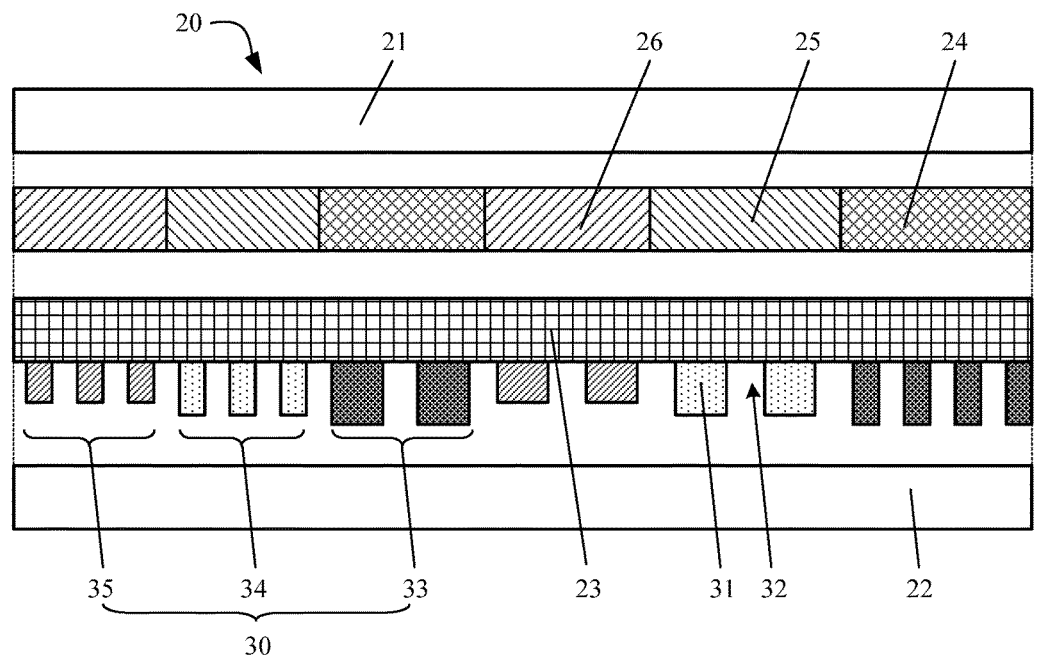
FIG. 3 is a cross-sectional view of a display device provided in an embodiment of the present disclosure.

Referring to FIGS. 1 to 3, a display device 10 provided in an embodiment of the present disclosure includes: a display panel 20 and a grating layer 30 disposed inside the display panel 20 or outside the display panel 20. The display panel 20 includes a plurality of R pixels 24, a plurality of G pixels 25 and a plurality of B pixels 26. The grating layer 30 includes an R grating region 33 corresponding to the R pixel, a G grating region 34 corresponding to the G pixel 25, and a B grating region 35 corresponding to the B pixel 26. Along a direction pointing from a center of the central area A of the view field of the display device 10 to the non-central area B of the view field of the display device 10, each of the grating period of the R grating region 33, the grating period of the G grating region 34, and the grating period of the B grating region 35 gradually decreases. Light emitted by a position of the display device 10 corresponding to the R pixel 24, light emitted by a position of the display device 10 corresponding to the G pixel 25 and light emitted by a position of the display device 10 corresponding to the B pixel 26 are directed straightly to the eyes of the viewer Z.

It should be noted that in the above-described embodiment, the display device 10 may be flat, or may be curved. In the present embodiment, the display device 10 is described as a flat display device for example.

For example, referring to FIGS. 1 and 2, the display device 10 provided in the embodiment of the present disclosure has a central area A of the view field and a non-central area B of the view field. The central area A of the view field and the non-central area B of the view field together form a light exit surface of the display device 10. A viewing area is located in front of the display device 10, and when a viewer Z is located within the viewing area and watching the frame displayed by the display device 10, the viewer's sight is focused within the central area A of the view field.

When the viewer Z is located in the viewing area in front of the display device 10 and watching the frame displayed by the display device 10, the viewer Z sees the frame as if it were projected on a virtual screen 40 in front of the display device 10 or behind the display device 10. The viewer Z, the display device 10 and the virtual screen 40 constitute an optical system in which the virtual screen 40 may be located at a focal plane of the optical system. For example, the virtual screen 40 may be located at a back focal plane of the optical system, meaning that the virtual screen 40 is located at a focal plane behind the display device 10; or the virtual screen 40 may be located at a front focal plane of the optical system, meaning that the virtual screen 40 is located at a focal plane in front of the display device 10. Assuming that there is a point Y on the virtual screen 40, the frame seen by the viewer Z at the point Y is a frame displayed at a point X on the display device 10. The viewer Z, the point Y on the virtual screen 40, and the point X on the display device 10 are located on the same straight line. In this case, the distance XY is a defocus amount, and frames displayed at various positions of the display device 10 may be calculated from the corresponding defocus amounts. Alternatively, frames displayed at various positions of the display device 10 may be recorded by a specialized device and may be saved and acquired.

In the practical application, when the viewer Z is located within the viewing area in front of the display device 10 and watching the frame displayed by the display device 10, the frame seen by the viewer Z may also include a depth-of-field scene. The depth-of-field scene may be recorded by a specialized device and may be processed and acquired, or may be acquired from calculation by a display chip or a central processing unit (CPU) of the display device 10 through an image processing algorithm. Therefore, the frame displayed by the display device 10 may be one of the following: only a frame projected on a certain virtual screen 40 in front of the display device 10; only a frame projected on a certain virtual screen 40 behind the display device 10; a frame projected on a certain virtual screen 40 in front of the display device 10 and a depth-of-field scene of the virtual screen 40; a frame projected on a certain virtual screen 40 behind the display device 10 and a depth-of-field scene of the virtual screen 40; a frame projected on a certain virtual screen 40 in front of the display device 10 and a depth-of-field scene of the display device 10; a frame projected on a certain virtual screen 40 behind the display device 10 and a depth-of-field scene of the display device 10; frames projected on all virtual screens 40 seen by the viewer Z and depth-of-field scenes of the virtual screens 40.

Referring to FIG. 3, the display device 10 includes a display panel 20 and a grating layer 30. The display panel 20 may be a liquid crystal display panel or an OLED (Organic Light-Emitting Diode) display panel, a PDP (Plasma Display Panel) display panel, a CRT (Cathode Ray Tube) display panel, and the like. The grating layer 30 is disposed inside the display panel 20 or outside the display panel 20. For example, the display device 10 is a liquid crystal display device. The display device 10 includes a backlight source and a display panel 20 located on the light exit side of the backlight source. The display panel 20 includes a first substrate 21 and a second substrate 22 disposed opposite to each other. The grating layer 30 may be disposed between the first substrate 21 and the second substrate 22. Alternatively, the grating layer 30 may be disposed on the surface of the first substrate 21 facing away from the second substrate 22. Alternatively, the grating layer 30 may be disposed on the surface of the second substrate 22 facing away from the first substrate 21. Alternatively, the grating layer 30 may be disposed at the light exit side of the backlight source.

The display device 10 employs a color scheme of RGB (Red, Green, Blue). The display panel 20 includes a plurality of R pixels 24, a plurality of G pixels 25, and a plurality of B pixels 26. The grating layer 30 includes an R grating region 33 corresponding to the R pixel, a G grating region 34 corresponding to the G pixel 25, and a B grating region 35 corresponding to the B pixel 26. Along a direction pointing from a center of the central area A of the view field to the non-central area B of the view field, each of the grating period of the R grating region 33, the grating period of the G grating region 34, and the grating period of the B grating region 35 gradually decreases. That is, along a direction pointing from a center of the central area A of the view field to the edge of the display device 10, each of the grating period of the R grating region 33, the grating period of the G grating region 34, and the grating period of the B grating region 35 gradually decreases. As shown in FIG. 2, the central area A of the view field is located in the middle of the display device 10, and the non-central area B of the view field surrounds the central area A of the view field. From the center a of the central area A of the view field to the upper edge of the display device 10 as shown in FIG. 2, each of the grating period of the R grating region 33, the grating period of the G grating region 34, and the grating period of the B grating region 35 gradually decreases. From the center a of the central area A of the view field to the lower edge of the display device 10 as shown in FIG. 2, each of the grating period of the R grating region 33, the grating period of the G grating region 34, and the grating period of the B grating region 35 gradually decreases. From the center a of the central area A of the view field to the left edge of the display device 10 as shown in FIG. 2, each of the grating period of the R grating region 33, the grating period of the G grating region 34, and the grating period of the B grating region 35 gradually decreases. From the center a of the central area A of the view field to the right edge of the display device 10 as shown in FIG. 2, each of the grating period of the R grating region 33, the grating period of the G grating region 34, and the grating period of the B grating region 35 gradually decreases.

Light emitted by a position of the display device 10 corresponding to the R pixel 24, light emitted by a position of the display device 10 corresponding to the G pixel 25 and light emitted by a position of the display device 10 corresponding to the B pixel 26 are directed straightly to the viewer Z. That is, light emitted by the position of the display device 10 corresponding to the R pixel 24, light emitted by the position of the display device 10 corresponding to the G pixel 25 and light emitted by the position of the display device 10 corresponding to the B pixel 26 are respectively emitted along a straight line formed by the position of the R pixel 24 and the viewer, a straight line formed by the position of the G pixel 25 and the viewer, and a straight line formed by the position of the B pixel 26 and the viewer. For example, as shown in FIG. 1, there is a point Y on the virtual screen 40. The frame seen by the viewer Z at the point Y is a frame displayed at a point X on the display device 10. The viewer Z, the point Y on the virtual screen 40, and the point X on the display device 10 are located on the same straight line. Light emitted at the point X on the display device 10 is emitted directly toward the viewer Z. That is, the light emitted at the point X on the display device 10 is emitted along a straight line which the viewer Z, the point Y on the virtual screen 40 and the point X on the display device 10 are located. When the point X on the display device 10 corresponds to the R pixel, the point X on the display device 10 emits a red light, and the red light is emitted along a straight line which the viewer Z, the point Y on the virtual screen 40 and the point X on the display device 10 are located. When the point X on the display device 10 corresponds to the G pixel, the point X on the display device 10 emits a green light, and the green light is emitted along a straight line which the viewer Z, the point Y on the virtual screen 40 and the point X on the display device 10 are located. When the point X on the display device 10 corresponds to the B pixel, the point X on the display device 10 emits a blue light, and the blue light is emitted along a straight line which the viewer Z, the point Y on the virtual screen 40 and the point X on the display device 10 are located.

The display device 10 provided in the embodiment of the present disclosure is provided with a grating layer 30. Light incident to the grating layer 30 is diffracted at the grating layer 30 and generates k (k=0, ±1, ±2 . . . ) orders of diffraction. A relationship between a diffraction angle of a k-order diffraction and a grating period P of the grating generally satisfies the following equation:

$$\sin\theta = \sin\theta_0 + \frac{k\lambda}{P}, k = 0, \pm 1, \pm 2 \ldots \quad (1)$$

In the equation (1), $\theta_0$ is an incident angle of the light incident on the grating layer 30, and $\lambda$ is a wavelength of the light incident on the grating layer 30.

According to equation (1), when the incident angle $\theta_0$ incident on the grating layer 30 is constant, for a 0-order diffraction, a diffraction angle $\theta$ of the 0-order diffraction is equal to the incident angle $\theta_0$ incident on the grating layer 30, and the grating period P of the grating does not affect the diffraction angle $\theta$ of the 0-order diffraction; for a non-0-order diffraction, for example, for a 1st order diffraction, a second order diffraction, a third order diffraction, and so on, with the increase of the grating period P, the diffraction angle $\theta$ of the non-0-order diffraction gradually increases. Therefore, by setting different grating periods P, the diffraction angle $\theta$ of the non-0-order diffraction may be adjusted, such that the light of the non-0-order diffraction may be emitted along a set direction.

Specifically, the display device 10 includes a central area A of the view field and a non-central area B of the view field. The central area A of the view field is located in the middle of the display device 10, and the non-central area B of the view field surrounds the central area A of the view field. When the viewer Z watches the frame displayed by the display device 10, the viewer Z's sight is focused within the central area A of the view field. The light emitted from the central area A of the view field and directed straightly to the eyes of the viewer Z may be regarded as a 0-order diffracted light obtained by the incident light passing through the grating layer 30 corresponding to the central area A of the view field. The light emitted from the non-central area B of the view field and directed straightly to the eyes of the viewer Z is subject to deflection before being directed straightly to the eyes of the viewer Z. That is, the light emitted from the non-central area B of the view field and directed straightly to the eyes of the viewer Z may be regarded as a non-0-order diffracted light obtained by the incident light passing through the grating layer 30 corresponding to the non-central area B of the view field. Therefore, the grating period of the grating layer 30 corresponding to the non-central area B of the view field shown in FIG. 2 may be set to be smaller than the grating period of the grating layer 30 corresponding to the central area A of the view field, such that the non-0-order diffracted light obtained after the incident light being diffracted by the grating layer 30 corresponding to the non-central area B of the view field has a proper diffraction angle. The non-0-order diffracted light is deflected toward the sight line of the viewer Z, and is directed straightly into the eyes of the viewer Z. That is, the grating period of the grating layer 30 may be set such that the diffraction angle of the non-0-order diffracted light obtained after the incident light being diffracted by the grating layer 30 corresponding to the non-central area B of the view field may be adjusted, such that the non-0-order diffracted light obtained after the incident light being diffracted by the grating layer 30 corresponding to the non-central area B of the view field may have a proper diffraction angle. Thus, the non-0-order diffracted light is deflected toward the sight line of the viewer Z, and is directed straightly into the eyes of the viewer Z.

For example, referring to FIG. 1, when the viewer Z is located within the viewing area in front of the display device 10 and watching the frame displayed by the display device 10, the viewer Z sees the frame as if it were projected on a virtual screen 40 behind the display device 10. The frame seen by the viewer Z at the point Y on the virtual screen 40 corresponds to a frame displayed at the point X on the display device 10. Assuming that the point X is located in the non-central area B of the view field of the display device 10, in order to make the frame at the point Y on the virtual screen 40 to be seen by the viewer Z, the grating period P of a position of the grating layer 30 corresponding to the X point may be set so as to adjust a diffraction angle $\theta$ of a non-0-order diffraction obtained after the incident light being diffracted at the position of the grating layer 30 corresponding to the X point, so that the light of the non-0-order diffraction is emitted along the straight line where Z, X and Y are located. Then, the frame at the point Y on the virtual screen 40 may be seen by the left eye of the viewer Z.

Figure 4:
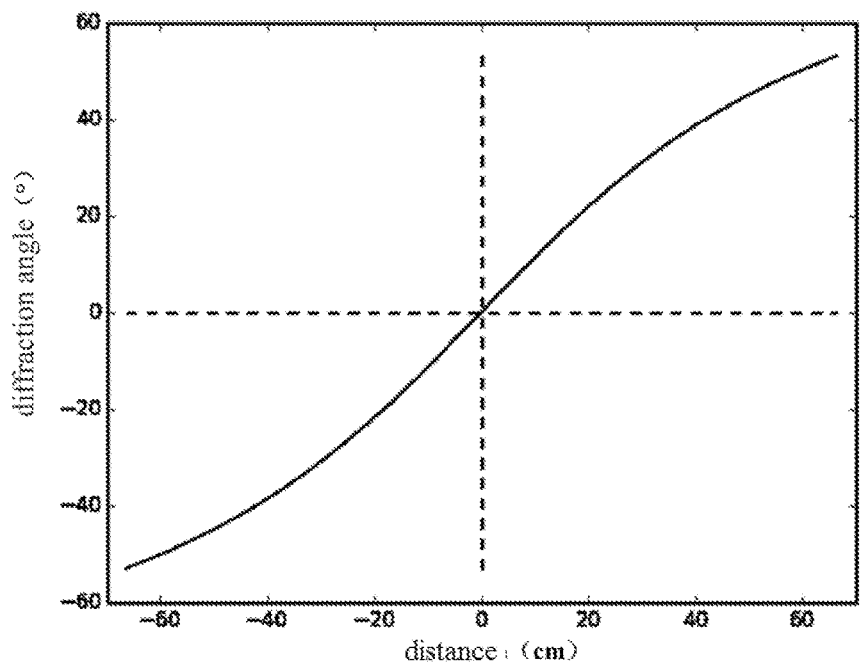
FIG. 4 is a graph of diffraction angles of the 1st order diffraction at different locations of the display device.

For example, assuming that the size of the display device 10 is 60 inches, the width of the display device 10 is 132.83 cm, the central area A of the view field is located in the middle of the display device 10, the center a of the central area A of the view field corresponds to the center of the display device 10, and the left-right direction in FIG. 2 is the width direction of the display device 10, FIG. 4 illustrates a graph of relationship between deflection angles of the incident light required for the light of $1^{st}$ order diffraction obtained after the incident light being diffracted at different positions of the grating layer 30 to be directed straightly to the eyes of the viewer Z, and the positions in the display device 10, along the left-right direction in FIG. 2, that is, a graph of relationship between the diffraction angles $\theta$ required for the light of $1^{st}$ order diffraction obtained after the incident light being diffracted at different positions of the grating layer 30 to be directed straightly to the eyes of the viewer Z and positions in the display device 10, along the left-right direction in FIG. 2. For example, along the left-right direction in FIG. 2, at a position having a distance of 20 cm from the center of the display device 10, the light of $1^{st}$ order diffraction obtained after the incident light being diffracted at a position of the R grating region 33 corresponding to that position should have a diffraction angle $\theta$ of 20°, the light of $1^{st}$ order diffraction obtained after the incident light being diffracted at a position of the G grating region 34 corresponding to that position should have a diffraction angle $\theta$ of 20°, and the light of $1^{st}$ order diffraction obtained after the incident light being diffracted at a position of the B grating region 35 corresponding to that position should have a diffraction angle $\theta$ of 20°. At a position having a distance of 40 cm from the center of the display device 10, the light of $1^{st}$ order diffraction obtained after the incident light being diffracted at a position of the R grating region 33 corresponding to that position should have a diffraction angle $\theta$ of 35°, the light of $1^{st}$ order diffraction obtained after the incident light being diffracted at a position of the G grating region 34 corresponding to that position should have a diffraction angle $\theta$ of 35°, and the light of $1^{st}$ order diffraction obtained after the incident light being diffracted at a position of the B grating region 35 corresponding to that position should have a diffraction angle $\theta$ of 35°.

By setting the grating periods of the R grating region 33, G grating region 34 and B grating region 35 of the grating layer 30 at respective positions, the diffraction angles $\theta$ of the light of $1^{st}$ order diffraction obtained by the incident light after being diffracted by the R grating region 33 at respective positions, the diffraction angles $\theta$ of the light of $1^{st}$ order diffraction obtained by the incident light after being diffracted by the G grating region 34 at respective positions and the diffraction angles $\theta$ of the light of $1^{st}$ order diffraction obtained by the incident light after being diffracted by the B grating region 35 at respective positions may reach required angles, such that the light of $1^{st}$ order diffraction obtained by the incident light after being diffracted by the R grating region 33 at respective positions may be directed straightly to the eyes of the viewer, and emitted along the straight line where the position of the viewer Z, the position on the virtual screen 40 and the position on the display device 10 corresponding to the position on the virtual screen 40 are located; the light of $1^{st}$ order diffraction obtained by the incident light after being diffracted by the G grating region 34 at respective positions may be directed straightly to the eyes of the viewer, and emitted along the straight line where the position of the viewer Z, the position on the virtual screen 40 and the position on the display device 10 corresponding to the position on the virtual screen 40 are located; and the light of $1^{st}$ order diffraction obtained by the incident light after being diffracted by the B grating region 35 at respective positions may be directed straightly to the eyes of the viewer, and emitted along the straight line where the position of the viewer Z, the position on the virtual screen 40 and the position on the display device 10 corresponding to the position on the virtual screen 40 are located.

It may be seen from the above that, for the display device 10 provided by the embodiments of the present disclosure, by providing a grating layer 30 inside or outside the display panel 20, and setting the grating periods of the grating layer 30 at respective positions, diffraction effect of the light propagated within the display device 10 may be controlled, to implement control of the propagation of the light within the display device 10, and in turn, to achieve control of the light emitted by the display device 10. That is, in the embodiments of the present disclosure, the control of the propagation of the light within the display device 10 is implemented based on structures according to physical optics principle. Compared with the related art in which the control of the propagation of the light within the display device 10 is implemented based on structures according to geometrical optics, the ability of controlling the propagation of the light within the display device 10 based on structures according to physical optics principle is higher, so that the propagation of the light within the display device 10 may be better controlled, and it may improve the effect of controlling the propagation of the light within the display device 10, and improve the on-spot effect of the display of the display device 10 and the viewer Z's sense of immersion. Then, it may improve the viewing experience of the viewer Z, and bring a more realistic and comfortable viewing experience for the viewer Z.

It should be noted that the grating layer 30 includes an R grating region 33 corresponding to the R pixel 24, a G grating region 34 corresponding to the G pixel 25, and a B grating region 35 corresponding to the B pixel 26. The R grating region 33 and the G grating region 34 and the B grating region 35 may be disposed in the same layer. Alternatively, the grating layer 30 may be divided into a first layer, a second layer and a third layer which are stacked. The R grating region 33 may be located at the first layer, the G grating region 34 may be located at the second layer, and the B grating region 35 may be located at the third layer. That is, the R grating region 33, the G grating region 34 and the B grating region 35 may be disposed at different layers. Compared with disposing the R grating region 33, the G grating region 34 and the B grating region 35 at the same layer, it may prevent interference among the R grating region 33, the G grating region 34 and the B grating region 35 during production of the grating layer 30, and it may facilitate the production of the grating layer 30.

In practice application, depending on different functions of the display device 10 and different positions of the viewing areas in front of the display device 10, positions of the central area A of the view field and the non-central area B of the view field of the display device 10 may vary. For example, for a certain display device 10, the central area A of the view field may be located at the left side in FIG. 2. In this case, the non-central area B of the view field is located at the right side in FIG. 2. Alternatively, for a certain display device 10, the central area A of the view field may be located at the right side in FIG. 2. In this case, the non-central area B of the view field is located at the left side in FIG. 2.

It should be noted that a $k^{th}$ (k=0, ±1, ±2 . . . ) order diffraction is obtained by the incident light on the grating layer 30 after being diffracted by the grating layer 30. When the light exit direction of a certain region of the display device is adjusted, generally, the grating period in the region of the grating layer 30 corresponding to that region is adjusted, to adjust the diffraction angle of a non-0-order diffraction obtained after light being diffracted at the region of the grating layer 30 corresponding to that region. For example, by adjusting the grating period of the region of the grating layer 30 corresponding to that region, the diffraction angles of a $1^{st}$ order diffraction, a $2^{nd}$ order diffraction and a $3^{rd}$ order diffraction may be adjusted. In practical application, a $k^{th}$ (k=0, ±1, ±2 . . . ) order diffraction is obtained by the incident light on the grating layer 30 after being diffracted by the grating layer 30, where the 0-order diffraction has the largest intensity, and the intensity of the $k^{th}$ order diffraction gradually decreases with |k| increases. Moreover, generally, the intensity of the $2^{nd}$ order diffraction differs from the intensity of the $1^{st}$ order diffraction by one or more magnitudes. That is, the intensity of the $2^{nd}$ order diffraction is much smaller than the intensity of the $1^{st}$ order diffraction. Therefore, adjusting the diffraction angle of a non-0-order diffraction obtained after light being diffracted at the region of the grating layer 30 corresponding to that region may be performed by adjusting only the diffraction angle of the $1^{st}$ order diffraction.

In the present embodiment, adjusting the diffraction angle of the $1^{st}$ order diffraction obtained by the incident light after being diffracted by the grating layer 30, and the intensities of the 0-order diffraction and the $1^{st}$ order diffraction obtained by the incident light after being diffracted by the grating layer 30 are illustrated as an example.

It should be noted that the display device 10 provided by the embodiments of the present disclosure may be a virtual display device, a near-eye display device, an AR/VR display device, and the like.

In the above-described embodiments, depending on different functions of the display device 10 and different positions of the viewing areas in front of the display device 10, the grating layer 30 may be differently disposed. Three kinds of dispositions of the grating layer 30 will be illustrated as examples below, however, the dispositions are not limited to the three kinds of dispositions.

In a first disposition of the grating layer 30, referring to FIGS. 1, 2, 3, 5 and 6, the display device 10 has a central area A of the view field and a non-central area B of the view field. The central area A of the view field is located in the middle region of the display device 10, and the center a of the central area A of the view field corresponds to the center of the display device 10. Along the lateral direction of the display device 10, from the center of the display device 10 to either side of the display device 10, each of the grating period of the R grating region 33, the grating period of the G grating region 34, and the grating period of the B grating region 35 gradually decreases.

Figure 5:
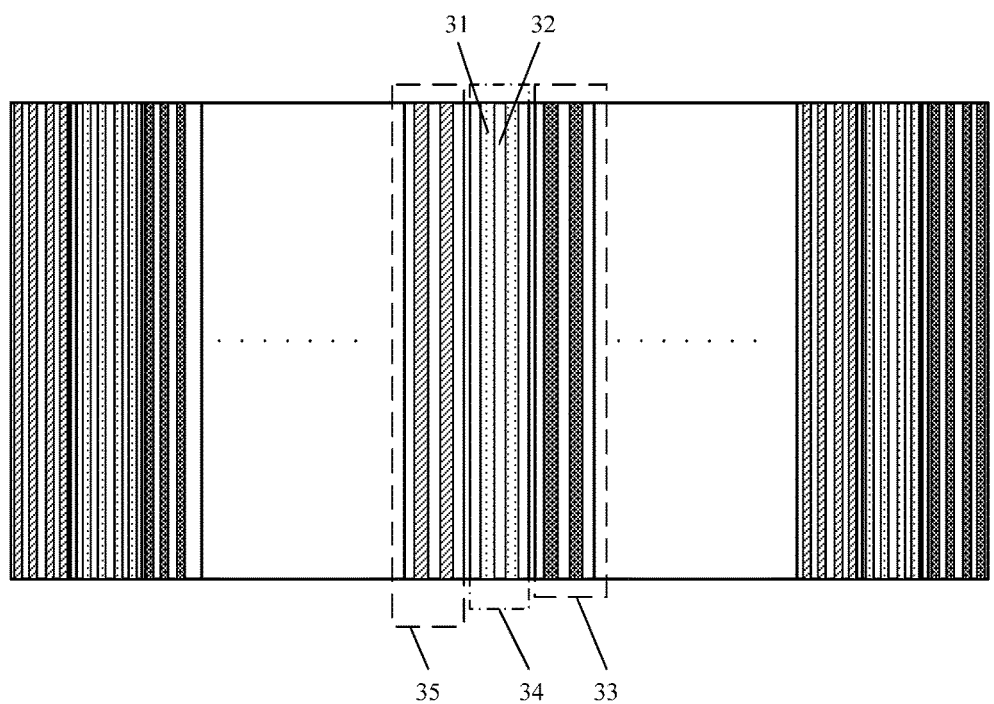
FIG. 5 is a schematic diagram illustrating a grating layer provided in an embodiment of the present disclosure.

Specifically, for example, the size of the display device 10 is 60 inches, the width of the display device 10 is 132.83 cm, and the height of the display device 10 is 74.72 cm. For example, as shown in FIGS. 2 and 5, the left-right direction in FIG. 2 or 5 is the width direction of the display device 10, and the up-down direction in FIG. 2 or 5 is the height direction of the display device 10. The viewing area of the display device 10 is located right in front of the display device 10, and the viewing area of the display device 10 is opposite to the center of the width direction of the display device 10.

The lateral direction of the display device 10 may be considered to be a direction parallel to the connection line of the two eyes of the viewer, and the longitudinal direction of the display device 10 may be considered to be a direction perpendicular to the connection line of the two eyes of the viewer. For the above display device 10, the width direction of the display device 10 is parallel to the connection line of the two eyes of the viewer. That is, the left-right direction in FIG. 2 is the lateral direction of the display device 10, and the up-down direction in FIG. 2 is the longitudinal direction of the display device 10.

The distance between the viewer Z and the display device 10 may be greater than 0 m and less than 500 m. In order to obtain a better viewing angle for the viewer Z, the distance between the viewer Z and the display device 10 may be preferably 0.5 m. In this case, when the viewer Z watches the frame displayed by the display device 10, the viewer Z's sight is focused on the middle portion of the display device 10 along its width direction. That is, along the left-right direction in FIG. 5, the viewer Z's sight is focused on the middle portion of the display device 10. In this case, the central area A of the view field is corresponds to the middle region of the display device 10 along its width direction, the center a of the central area A of the view field corresponds to the center of the display device 10, and the non-central area B of the view field is located at two sides of the central area A of the view field.

A vertical line $q_{A1}$ is set passing through the center a of the central area A of the view field in FIG. 2. Along the lateral direction of the display device 10, from the vertical line $q_{A1}$ in FIG. 2 to either of the left and right sides of the display device 10, each of the grating period of the R grating region 33, the grating period of the G grating region 34, and the grating period of the B grating region 35 gradually decreases. That is, along the lateral direction of the display device 10, the farther the distance is from the vertical line $q_{41}$, the larger the diffraction angle of the $1^{st}$ order diffraction obtained by the incident light passing through the R grating region 33 is, the larger the diffraction angle of the $1^{st}$ order diffraction obtained by the incident light passing through the G grating region 34 is, and the larger the diffraction angle of the $1^{st}$ order diffraction obtained by the incident light passing through the B grating region 35 is, corresponding to the deflection angles required for the light to be emitted from different positions of the display device toward the viewer Z, along the lateral direction of the display device 10 as shown by the curve q1 in FIG. 6.

Figure 6:
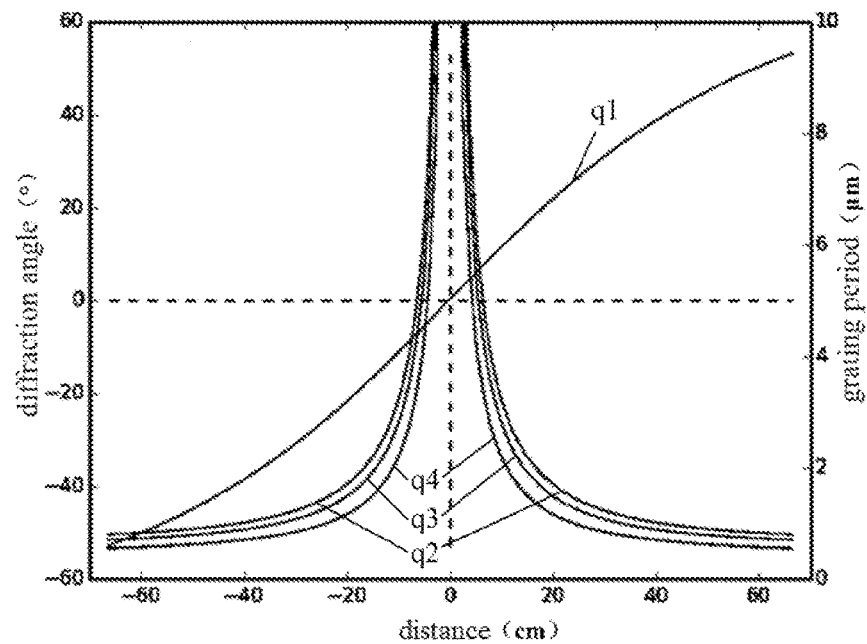
FIG. 6 is a graph of the grating period of the grating layer as shown in FIG. 5.

As shown in FIGS. 2, 5 and 6, along the left-right direction in FIG. 5, according to the curve q1 in FIG. 6 and the equation (1), a distribution curve of the grating periods of the R grating region 33 may be obtained. As shown by the curve q2 in FIG. 6, the grating period of the region of the R grating region 33 corresponding to the vertical line $q_{41}$ is the largest, and the grating period of the region of the R grating region 33 corresponding to either side of the display device 10 is smaller. For example, the grating period of the region of the R grating region 33 corresponding to the vertical line $q_{41}$ may be larger than or equal to 50 µm, and the grating period of the region of the R grating region 33 corresponding to either side of the display device 10 may be 0.8 µm.

Along the left-right direction in FIG. 5, according to the curve q1 in FIG. 6 and the equation (1), a distribution curve of the grating periods of the G grating region 34 may be obtained. As shown by the curve q3 in FIG. 6, the grating period of the region of the G grating region 34 corresponding to the vertical line $q_{41}$ is the largest, and the grating period of the region of the G grating region 34 corresponding to either side of the display device 10 is smaller. For example, the grating period of the region of the G grating region 34 corresponding to the vertical line $q_{41}$ may be larger than or equal to 50 µm, and the grating period of the region of the G grating region 34 corresponding to either side of the display device 10 may be 0.7 µm.

Along the left-right direction in FIG. 5, according to the curve q1 in FIG. 6 and the equation (1), a distribution curve of the grating periods of the B grating region 35 may be obtained. As shown by the curve q4 in FIG. 6, the grating period of the region of the B grating region 35 corresponding to the vertical line $q_{41}$ is the largest, and the grating period of the region of the B grating region 35 corresponding to either side of the display device 10 is smaller. For example, the grating period of the region of the B grating region 35 corresponding to the vertical line $q_{41}$ may be larger than or equal to 50 µm, and the grating period of the region of the B grating region 35 corresponding to either side of the display device 10 may be 0.5 µm.

In the first disposition of the grating layer 30, by respectively setting the grating period of the R grating region 33, the grating period of the G grating region 34 and the grating period of the B grating region 35, it may adjust and control respectively the red light obtained from the R pixel 24, the green light obtained from the G pixel and the blue light obtained from the B pixel 25, such that each of the red lights, green lights and blue lights emitted from respective positions of the display device 10 may be deflected toward the sight line of the viewer Z along the lateral direction of the display device 10, and deflected along the straight line where the position of the viewer Z, the position on the virtual screen 40 and the position on the display device 10 corresponding to the position on the virtual screen 40 are located, thus improving the on-site effect of the display of the display device 10 and the viewer Z's sense of immersion. Then, it may improve the viewing experience of the viewer Z, and bring a more realistic and comfortable viewing experience for the viewer Z.

In the first disposition of the grating layer 30, along the lateral direction of the display device 10, from the center of the display device 10 to either side of the display device 10, each of the grating period of the R grating region 33, the grating period of the G grating region 34, and the grating period of the B grating region 35 gradually decreases. Therefore, the first disposition of the grating layer 30 may achieve adjusting of the light exit direction of the display device 10 along the lateral direction of the display device 10, thus improving the viewing experience of the viewer Z along the lateral direction of the display device 10.

In a second disposition of the grating layer 30, referring to FIGS. 1, 2, 3, 7 and 8, the display device 10 has a central area A of the view field and a non-central area B of the view field. The central area A of the view field is located in the middle region of the display device 10, and the center a of the central area A of the view field corresponds to the center of the display device 10. Along the longitudinal direction of the display device 10, from the center of the display device 10 to either side of the display device 10, each of the grating period of the R grating region 33, the grating period of the G grating region 34, and the grating period of the B grating region 35 gradually decreases.

Figure 7:
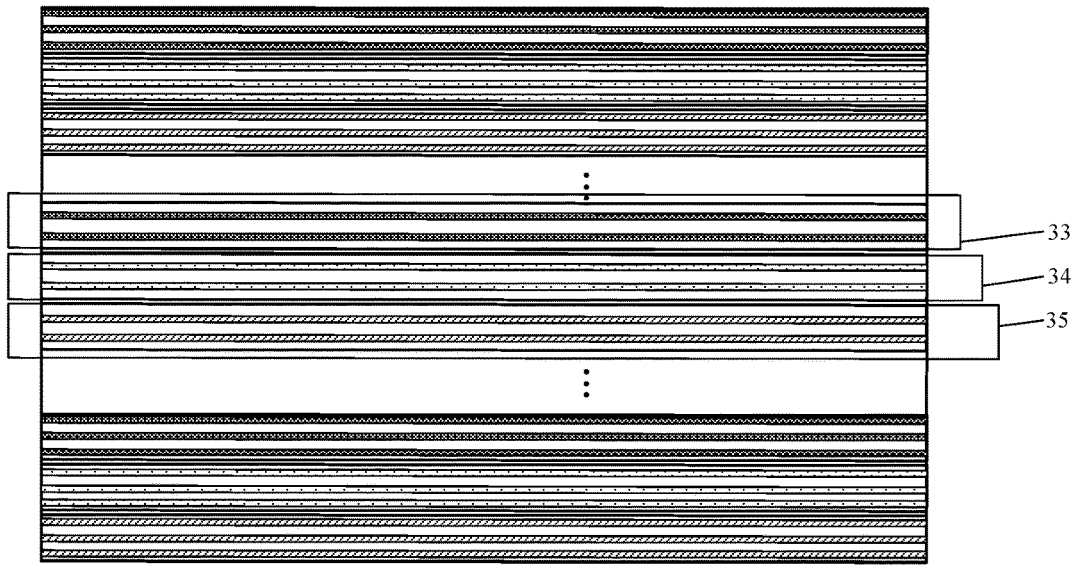
FIG. 7 is a schematic structural diagram illustrating another grating layer provided in an embodiment of the present disclosure.

Specifically, for example, the size of the display device 10 is 60 inches, the width of the display device 10 is 132.83 cm, and the height of the display device 10 is 74.72 cm. For example, as shown in FIGS. 2 and 7, the left-right direction in FIGS. 2 and 7 is the width direction of the display device 10, and the up-down direction in FIGS. 2 and 7 is the height direction of the display device 10. The viewing area of the display device 10 is located right in front of the display device 10, and the viewing area of the display device 10 is opposite to the center of the width direction of the display device 10.

The lateral direction of the display device 10 may be considered to be a direction parallel to the connection line of the two eyes of the viewer, and the longitudinal direction of the display device 10 may be considered to be a direction perpendicular to the connection line of the two eyes of the viewer. For the above display device 10, the width direction of the display device 10 is parallel to the connection line of the two eyes of the viewer. That is, the left-right direction in FIG. 2 is the lateral direction of the display device 10, and the up-down direction in FIG. 2 is the longitudinal direction of the display device 10.

When the viewer Z watches the frame displayed by the display device 10, the distance between the viewer Z and the display device 10 may be greater than 0 m and less than 500 m. In order to obtain a better viewing angle for the viewer Z, the distance between the viewer Z and the display device 10 may be preferably 0.5 m. In this case, when the viewer Z watches the frame displayed by the display device 10, the viewer Z's sight is focused on the middle portion of the display device 10 along its width direction. That is, along the left-right direction in FIG. 7, the viewer Z's sight is focused on the middle portion of the display device 10. In this case, the central area A of the view field corresponds to the middle region of the display device 10 along its width direction, the center a of the central area A of the view field corresponds to the center of the display device 10, and the non-central area B of the view field is located at the two sides of the central area A of the view field.

A lateral line $q_{42}$ is set passing through the center a of the central area A of the view field in FIG. 2. Along the longitudinal direction of the display device 10, from the lateral line $q_{42}$ in FIG. 2 to either of the left and right sides of the display device 10, each of the grating period of the R grating region 33, the grating period of the G grating region 34, and the grating period of the B grating region 35 gradually decreases. That is, along the longitudinal direction of the display device 10, the farther the distance is from the lateral line $q_{42}$, the larger the diffraction angle of the $1^{st}$ order diffraction obtained by the incident light being diffracted through the R grating region 33 is, the larger the diffraction angle of the $1^{st}$ order diffraction obtained by the incident light being diffracted through the G grating region 34 is, and the larger the diffraction angle of the $1^{st}$ order diffraction obtained by the incident light being diffracted through the B grating region 35 is, corresponding to the deflection angles required for the light to be emitted from different positions of the display device toward the viewer Z, along the longitudinal direction of the display device 10 as shown by the curve q5 in FIG. 8.

Figure 8:
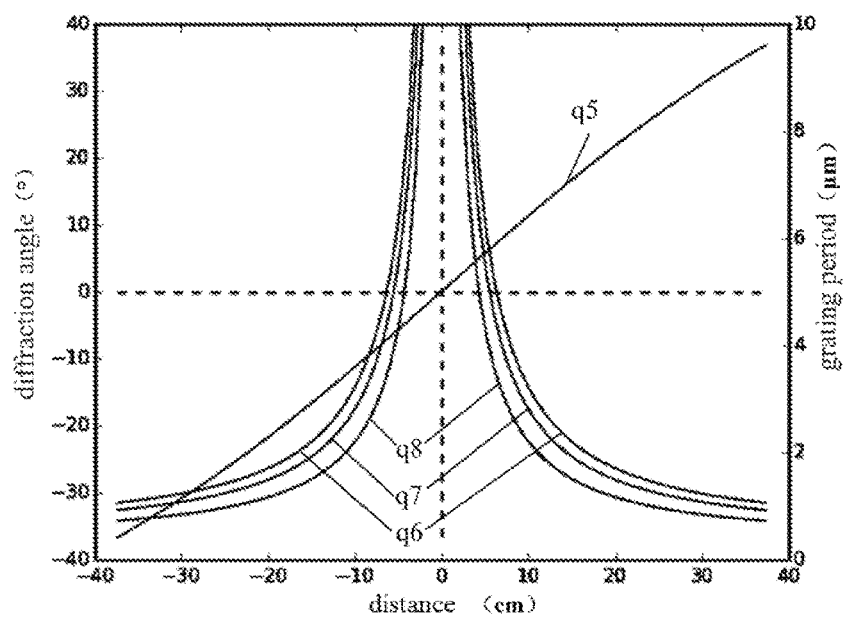
FIG. 8 is a graph of the grating period of the grating layer as shown in FIG. 7.

As shown in FIGS. 2, 7 and 8, along the left-right direction in FIG. 7, according to the curve q5 in FIG. 8 and the equation (1), a distribution curve of the grating periods of the R grating region 33 may be obtained. As shown by the curve q6 in FIG. 8, the grating period of the region of the R grating region 33 corresponding to the lateral line $q_{42}$ is the largest, and the grating period of the region of the R grating region 33 corresponding to either side of the display device 10 is smaller. For example, the grating period of the region of the R grating region 33 corresponding to the lateral line $q_{42}$ may be larger than or equal to 50 μm, and the grating period of the region of the R grating region 33 corresponding to either side of the display device 10 may be 1.2 μm.

Along the left-right direction in FIG. 7, according to the curve q5 in FIG. 8 and the equation (1), a distribution curve of the grating periods of the G grating region 34 may be obtained. As shown by the curve q7 in FIG. 8, the grating period of the region of the G grating region 34 corresponding to the lateral line $q_{42}$ is the largest, and the grating period of the region of the G grating region 34 corresponding to either side of the display device 10 is smaller. For example, the grating period of the region of the G grating region 34 corresponding to the lateral line $q_{42}$ may be larger than or equal to 50 μm, and the grating period of the region of the G grating region 34 corresponding to either side of the display device 10 may be 1 μm.

Along the left-right direction in FIG. 7, according to the curve q5 in FIG. 8 and the equation (1), a distribution curve of the grating periods of the B grating region 35 may be obtained. As shown by the curve q8 in FIG. 8, the grating period of the region of the B grating region 35 corresponding to the lateral line $q_{42}$ is the largest, and the grating period of the region of the B grating region 35 corresponding to either side of the display device 10 is smaller. For example, the grating period of the region of the B grating region 35 corresponding to the lateral line $q_{42}$ may be larger than or equal to 50 μm, and the grating period of the region of the B grating region 35 corresponding to either side of the display device 10 may be 0.8 μm.

In the second disposition of the grating layer 30, by respectively setting the grating period of the R grating region 33, the grating period of the G grating region 34 and the grating period of the B grating region 35, it may adjust and control respectively the red light obtained from the R pixel 24, the green light obtained from the G pixel and the blue light obtained from the B pixel 25, such that each of the red lights, green lights and blue lights emitted from respective positions of the display device 10 may be deflected toward the sight line of the viewer Z along the longitudinal direction of the display device 10, and deflected along the straight line where the position of the viewer Z, the position on the virtual screen 40 and the position on the display device 10 corresponding to the position on the virtual screen 40 are located, thus improving the on-site effect of the display of the display device 10 and the viewer Z's sense of immersion. Then, it may improve the viewing experience of the viewer Z, and bring a more realistic and comfortable viewing experience for the viewer Z.

In the second disposition of the grating layer 30, along the longitudinal direction of the display device 10, from the center of the display device 10 to either side of the display device 10, each of the grating period of the R grating region 33, the grating period of the G grating region 34, and the grating period of the B grating region 35 gradually decreases. Therefore, the second disposition of the grating layer 30 may achieve adjusting of the light exit direction of the display device 10 along the longitudinal direction of the display device 10, thus improving the viewing experience of the viewer Z along the longitudinal direction of the display device 10.

The display device 10 provided by the first disposition of the grating layer 30 may improve the viewing experience of the viewer Z along the lateral direction of the display device 10, and the display device 10 provided by the second disposition of the grating layer 30 may improve the viewing experience of the viewer Z along the longitudinal direction of the display device 10. In practical application, it may also improve both of the viewing experience of the viewer Z along the lateral direction of the display device 10 and the viewing experience of the viewer Z along the longitudinal direction of the display device 10.

Figure 9:
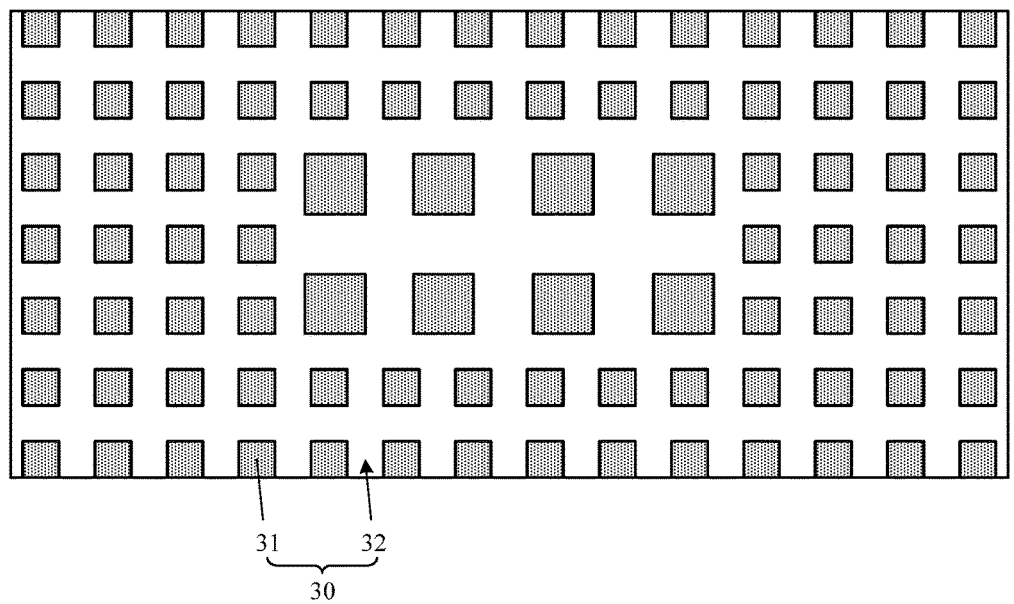
FIG. 9 is a schematic structural diagram illustrating yet another grating layer provided in an embodiment of the present disclosure.

In a third disposition of the grating layer 30, referring to FIGS. 1, 2 and 9, the display device 10 has a central area A of the view field and a non-central area B of the view field. The central area A of the view field is located in the middle region of the display device 10, and the center of the central area A of the view field corresponds to the center of the display device 10. Along the longitudinal direction of the display device 10, from the center of the display device 10 to either side of the display device 10, each of the grating period of the R grating region 33, the grating period of the G grating region 34, and the grating period of the B grating region 35 gradually decreases. Along the lateral direction of the display device 10, from the center of the display device 10 to either side of the display device 10, each of the grating period of the R grating region 33, the grating period of the G grating region 34, and the grating period of the B grating region 35 gradually decreases.

Specifically, for example, the size of the display device 10 is 60 inches, the width of the display device 10 is 132.83 cm, and the height of the display device 10 is 74.72 cm. For example, as shown in FIGS. 2 and 9, the left-right direction in FIGS. 2 and 9 is the width direction of the display device 10, and the up-down direction in FIGS. 2 and 9 is the height direction of the display device 10. The viewing area of the display device 10 is located right in front of the display device 10, and the viewing area of the display device 10 is opposite to the center of the width direction of the display device 10.

The lateral direction of the display device 10 may be considered to be a direction parallel to the connection line of the two eyes of the viewer, and the longitudinal direction of the display device 10 may be considered to be a direction perpendicular to the connection line of the two eyes of the viewer. For the above display device 10, the width direction of the display device 10 is parallel to the connection line of the two eyes of the viewer. That is, the left-right direction in FIG. 2 is the lateral direction of the display device 10, and the up-down direction in FIG. 2 is the longitudinal direction of the display device 10.

When the viewer Z watches the frame displayed by the display device 10, the distance between the viewer Z and the display device 10 may be greater than 0 m and less than 500 m. In order to obtain a better viewing angle for the viewer Z, the distance between the viewer Z and the display device 10 may be preferably 0.5 m. In this case, when the viewer Z watches the frame displayed by the display device 10, the viewer Z's sight is focused on the middle region of the display device 10. The central area A of the view field corresponds to the middle region of the display device 10, and the non-central area B of the view field is located at each side of the four directions of the central area A of the view field.

In the third disposition of the grating layer 30, along the longitudinal direction of the display device 10, from the center of the display device 10 to either side of the display device 10, each of the grating period of the R grating region 33, the grating period of the G grating region 34, and the grating period of the B grating region 35 gradually decreases. Along the lateral direction of the display device 10, from the center of the display device 10 to either side of the display device 10, each of the grating period of the R grating region 33, the grating period of the G grating region 34, and the grating period of the B grating region 35 gradually decreases. Therefore, along the lateral direction of the display device 10, the red lights, green lights and blue lights emitted from the two sides of the display device 10 are respectively deflected toward the sight of the viewer, and deflected along the straight line where the position of the viewer Z, the position on the virtual screen 40 and the position on the display device 10 corresponding to the position on the virtual screen 40 are located, thus improving the viewing experience of the viewer Z along the lateral direction of the display device 10. Along the longitudinal direction of the display device 10, the red lights, green lights and blue lights emitted from the two sides of the display device 10 are respectively deflected toward the sight of the viewer, and deflected along the straight line where the position of the viewer Z, the position on the virtual screen 40 and the position on the display device 10 corresponding to the position on the virtual screen 40 are located, thus improving the viewing experience of the viewer Z along the longitudinal direction of the display device 10. That is, in the display device 10 provided in the third disposition, the grating period of the R grating region 33, the grating period of the G grating region 34, and the grating period of the B grating region 35 changes respectively along the lateral direction and the longitudinal direction of the display device 10, thus improving both of the viewing experience of the viewer Z along the lateral direction of the display device 10 and the viewing experience of the viewer Z along the longitudinal direction of the display device 10.

It should be noted that in the third disposition of the grating layer 30, the grating layer 30 may include a lateral grating disposed along the lateral direction of the display device 10, and a longitudinal grating disposed along the longitudinal direction of the display device 10. The lateral grating and the longitudinal grating may be disposed in the same layer. Alternatively, the grating layer 30 may be divided into a lateral layer and a longitudinal layer, the lateral grating is disposed in the lateral layer and the longitudinal grating is disposed in the longitudinal layer.

In the above embodiments, the display panel 20 includes a plurality of R pixels, a plurality of G pixels, and a plurality of B pixels. The plurality of R pixels, the plurality of G pixels, and the plurality of B pixels may be arranged in various manners. That is, within the display panel 20, the arrangement of the pixels may be various, for example as follows.

Figure 10:
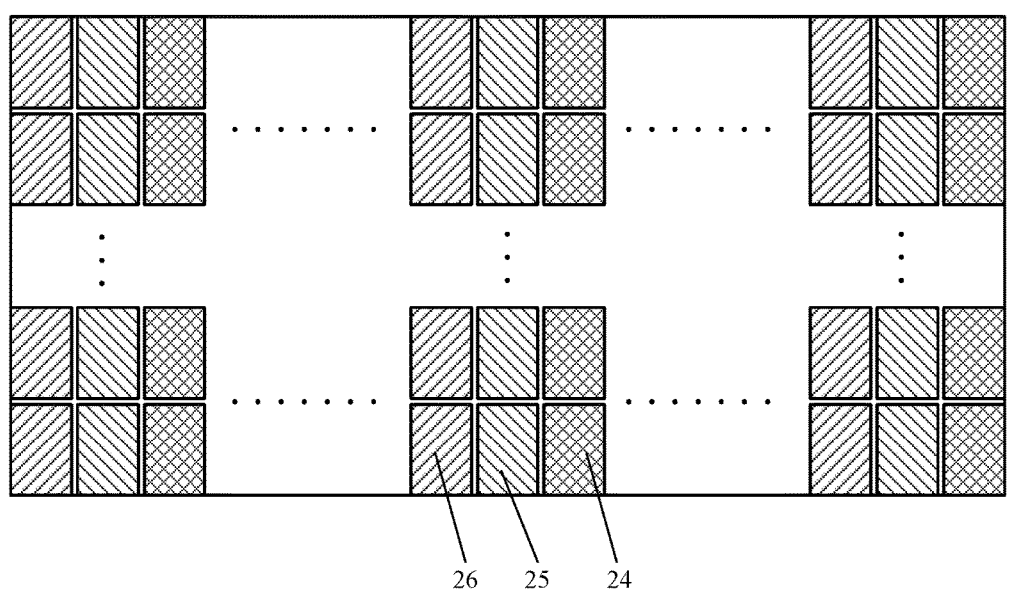
FIG. 10 shows a first pixel arrangement of the display device provided in an embodiment of the present disclosure.

Referring to FIG. 10 for a first arrangement of pixels, along the lateral direction of the display device 10, the display device 10 includes a plurality of R pixel columns, a plurality of G pixel columns and a plurality of B pixel columns. The plurality of R pixel columns, the plurality of G pixel columns and the plurality of B pixel columns are arranged alternatingly. The R pixel column is formed by a plurality of R pixels 24 arranged along the longitudinal direction of the display device 10, the G pixel column is formed by a plurality of G pixels 25 arranged along the longitudinal direction of the display device 10, and the B pixel column is formed by a plurality of B pixels 26 arranged along the longitudinal direction of the display device 10.

Specifically, as shown in FIG. 10, the left-right direction in FIG. 10 is the lateral direction of the display device 10, and the up-down direction in FIG. 10 is the longitudinal direction of the display device 10. The plurality of R pixels 24, the plurality of G pixels 25, and the plurality of B pixels 26 are arranged in an array. That is, the plurality of R pixels 24, the plurality of G pixels 25, and the plurality of B pixels 26 form a pixel array. The pixel array includes a plurality of pixel rows extending along the lateral direction of the display device 10, and a plurality of pixel columns extending along the longitudinal direction of the display device 10. Each pixel row includes a plurality of R pixels 24, a plurality of G pixels 25, and a plurality of B pixels 26, which are arranged alternatingly. For example, it is possible that the R pixel 24, the G pixel 25, and the B pixel 26 are arranged in this order, or the G pixel 25, the R pixel 24, and the B pixel 26 are arranged in this order, or the G pixel 25, the B pixel 26, and the R pixel 24 are arranged in this order, and so on. The present disclosure is not limited thereto. Each pixel column includes one kind of the R pixels 24, the G pixels 25, and the B pixels 26, to form an R pixel column, a G pixel column and a B pixel column.

When the pixels in the display panel 20 are arranged in the first arrangement of pixels, and the grating layer 30 is provided in the above first disposition of the grating layer 30, it may be as follows. Still referring to FIG. 5, the grating layer 30 includes a plurality of grating protrusions 31. The grating protrusion 31 is a stripe-shaped grating protrusion and extends along the longitudinal direction of the display device 10. The plurality of grating protrusions 31 are arranged in parallel along the lateral direction of the display device 10. Specifically, the left-right direction in FIG. 5 is the lateral direction of the display device 10, and the up-down direction in FIG. 5 is the longitudinal direction of the display device 10. The grating layer 30 includes a plurality of grating protrusions 31. A gap 32 exists between two adjacent grating protrusions 31. The grating protrusions 31 includes an R grating protrusion corresponding to the R pixel 24, a G grating protrusion corresponding to the G pixel 25, and a B grating protrusion corresponding to the B pixel 26. The grating protrusion 31 is a stripe-shaped grating protrusion and extends along the longitudinal direction of the display device 10. That is, the R grating protrusion, the G grating protrusion and the B grating protrusion are strip-shaped grating protrusions. The R grating protrusion is parallel to the extending direction of the R pixel column, the G grating protrusion is parallel to the extending direction of the G pixel column, and the B grating protrusion is parallel to the extending direction of the B pixel column.

Figure 11:
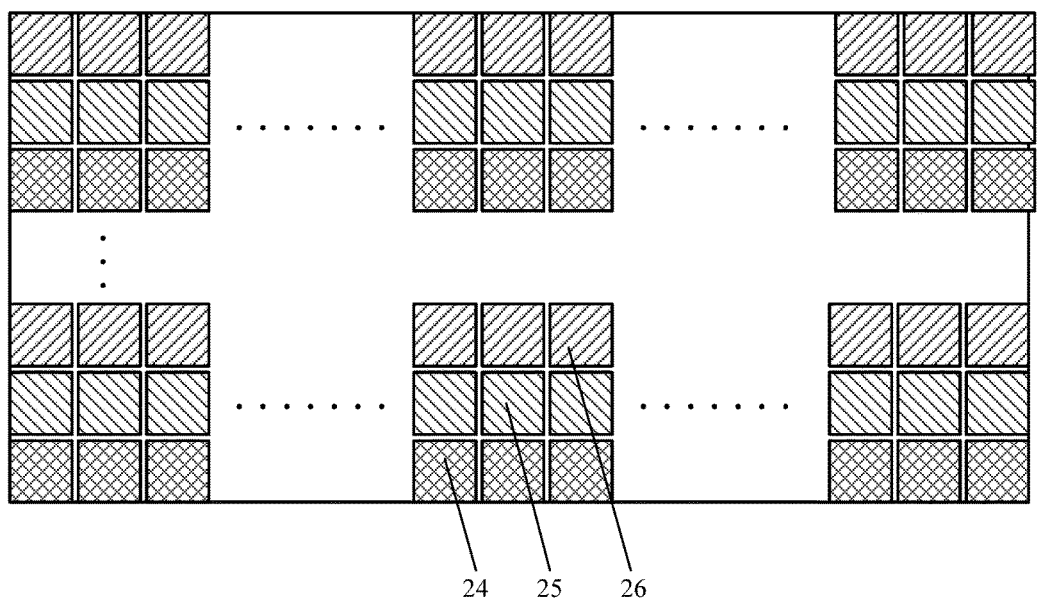
FIG. 11 shows a second pixel arrangement of the display device provided in an embodiment of the present disclosure.

Referring to FIG. 11 for a second arrangement of pixels, along the longitudinal direction of the display device 10, the display device 10 includes a plurality of R pixel rows, a plurality of G pixel rows and a plurality of B pixel rows. The plurality of R pixel rows, the plurality of G pixel rows and the plurality of B pixel rows are arranged alternatingly. The R pixel row is formed by a plurality of R pixels 24 arranged along the lateral direction of the display device 10, the G pixel row is formed by a plurality of G pixels 25 arranged along the lateral direction of the display device 10, and the B pixel row is formed by a plurality of B pixels 26 arranged along the lateral direction of the display device 10.

Specifically, as shown in FIG. 11, the left-right direction in FIG. 11 is the lateral direction of the display device 10, and the up-down direction in FIG. 11 is the longitudinal direction of the display device 10. The plurality of R pixels 24, the plurality of G pixels 25, and the plurality of B pixels 26 are arranged in an array. That is, the plurality of R pixels 24, the plurality of G pixels 25, and the plurality of B pixels 26 form a pixel array. The pixel array includes a plurality of pixel rows extending along the lateral direction of the display device 10, and a plurality of pixel columns extending along the longitudinal direction of the display device 10. Each pixel column includes a plurality of R pixels 24, a plurality of G pixels 25, and a plurality of B pixels 26, which are arranged alternatingly. For example, it is possible that the R pixel 24, the G pixel 25, and the B pixel 26 are arranged in this order, or the G pixel 25, the R pixel 24, and the B pixel 26 are arranged in this order, or the G pixel 25, the B pixel 26, and the R pixel 24 are arranged in this order, and so on. The present disclosure is not limited thereto. Each pixel row includes one kind of the R pixels 24, the G pixels 25, and the B pixels 26, to form an R pixel row, a G pixel row and a B pixel row.

When the pixels in the display panel 20 are arranged in the second arrangement of pixels, and the grating layer 30 is provided in the above second disposition of the grating layer 30, it may be as follows. Still referring to FIG. 7, the grating layer 30 includes a plurality of grating protrusions 31. The grating protrusion 31 is a stripe-shaped grating protrusion and extends along the lateral direction of the display device 10. The plurality of grating protrusions 31 are arranged in parallel in the longitudinal direction of the display device 10. Specifically, the left-right direction in FIG. 7 is the lateral direction of the display device 10, and the up-down direction in FIG. 7 is the longitudinal direction of the display device 10. The grating layer 30 includes a plurality of grating protrusions 31. A gap 32 exists between two adjacent grating protrusions 31. The grating protrusions 31 includes an R grating protrusion corresponding to the R pixel 24, a G grating protrusion corresponding to the G pixel 25, and a B grating protrusion corresponding to the B pixel 26. The grating protrusion 31 is a stripe-shaped grating protrusion and extends along the lateral direction of the display device 10. That is, the R grating protrusion, the G grating protrusion and the B grating protrusion are strip-shaped grating protrusions. The R grating protrusion is parallel to the extending direction of the R pixel column, the G grating protrusion is parallel to the extending direction of the G pixel column, and the B grating protrusion is parallel to the extending direction of the B pixel column.

Figure 12:
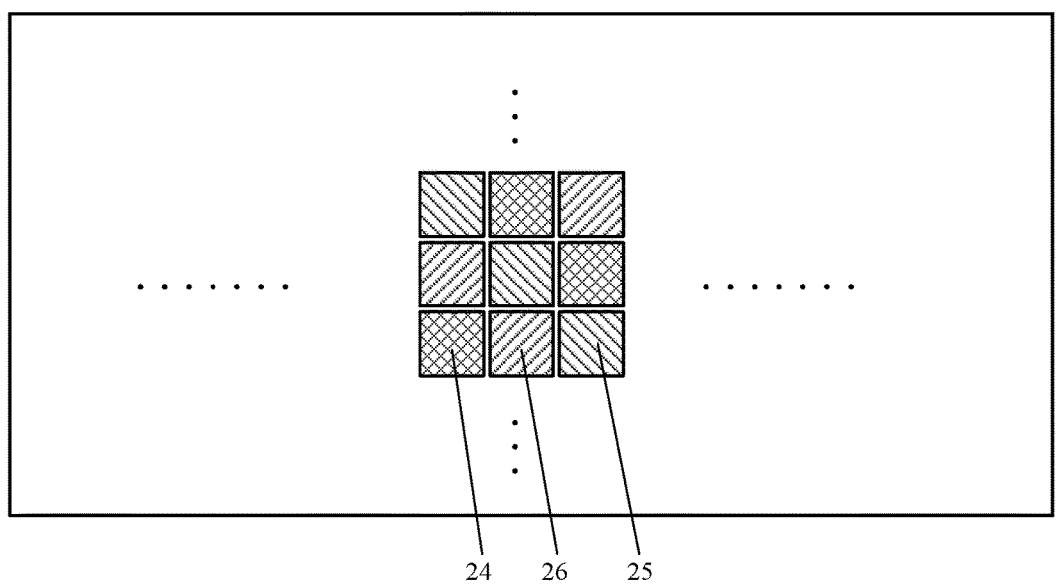
FIG. 12 shows a third pixel arrangement of the display device provided in an embodiment of the present disclosure.

Referring to FIG. 12 for a third arrangement of pixels, along the lateral direction of the display device 10, the R pixels 24, the G pixels 25 and the B pixels 26 are arranged alternatingly, and along the longitudinal direction of the display device 10, the R pixels 24, the G pixels 25 and the B pixels 26 are arranged alternatingly.

Specifically, as shown in FIG. 12, the left-right directions in FIG. 12 is the lateral direction of the display device 10, and the up-down direction in FIG. 12 is the longitudinal direction of the display device 10. The plurality of R pixels 24, the plurality of G pixels 25, and the plurality of B pixels 26 are arranged in an array. That is, the plurality of R pixels 24, the plurality of G pixels 25, and the plurality of B pixels 26 form a pixel array. The pixel array includes a plurality of pixel rows extending along the lateral direction of the display device 10, and a plurality of pixel columns extending along the longitudinal direction of the display device 10. Each pixel row includes a plurality of R pixels 24, a plurality of G pixels 25, and a plurality of B pixels 26, which are arranged alternatingly. For example, it is possible that the R pixel 24, the G pixel 25, and the B pixel 26 are arranged in this order, or the G pixel 25, the R pixel 24, and the B pixel 26 are arranged in this order, or the G pixel 25, the B pixel 26, and the R pixel 24 are arranged in this order, and so on. The present disclosure is not limited thereto. Each pixel column includes a plurality of R pixels 24, a plurality of G pixels 25, and a plurality of B pixels 26, which are arranged alternatingly. For example, it is possible that the R pixel 24, the G pixel 25, and the B pixel 26 are arranged in this order, or the G pixel 25, the R pixel 24, and the B pixel 26 are arranged in this order, or the G pixel 25, the B pixel 26, and the R pixel 24 are arranged in this order, and so on. The present disclosure is not limited thereto.

In the above embodiments, when the viewer Z is located in the viewing area in front of the display device 10 and watches the frame displayed by the display device 10, the viewer Z sees the frame as if it were projected on a virtual screen 40 behind the display device 10. The positional relationship among the viewer Z, the display device 10 and the virtual screen 40 may be various, for example as follows.

Figure 13:
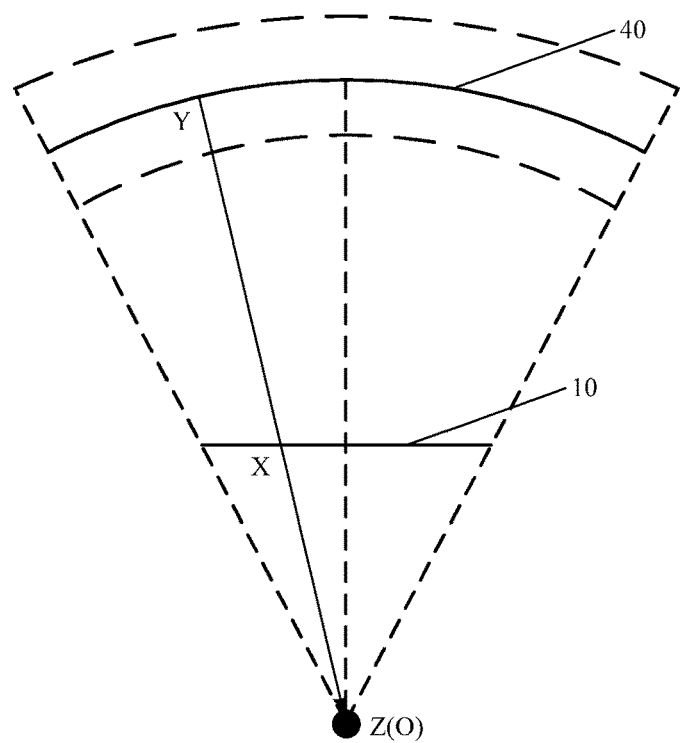
FIG. 13 is a diagram illustrating a first positional relationship among a viewer, a display device and a virtual screen.

Referring FIG. 13 for a first positional relationship among the viewer Z, the display device 10 and the virtual screen 40, the viewer Z watches the frame displayed by the display device 10. The frame is projected on the virtual screen 40 behind the display device 10. The virtual screen 40 is a curved-surface virtual screen. The virtual screen 40 has a circle center. The viewer Z is located at the circle center of the virtual screen 40.

Figure 14:
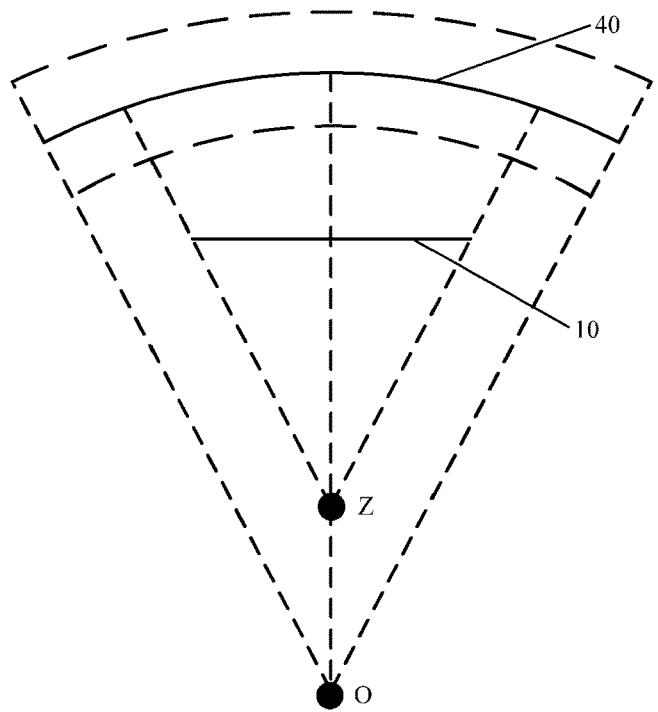
FIG. 14 is a diagram illustrating a second positional relationship among a viewer, a display device and a virtual screen.

Referring FIG. 14 for a second positional relationship among the viewer Z, the display device 10 and the virtual screen 40, the viewer Z watches the frame displayed by the display device 10. The frame is projected on the virtual screen 40 behind the display device 10. The virtual screen 40 is a curved-surface virtual screen. The virtual screen 40 has a circle center. The viewer Z is located at a side of the circle center of the virtual screen 40 facing the virtual screen 40.

Figure 15:
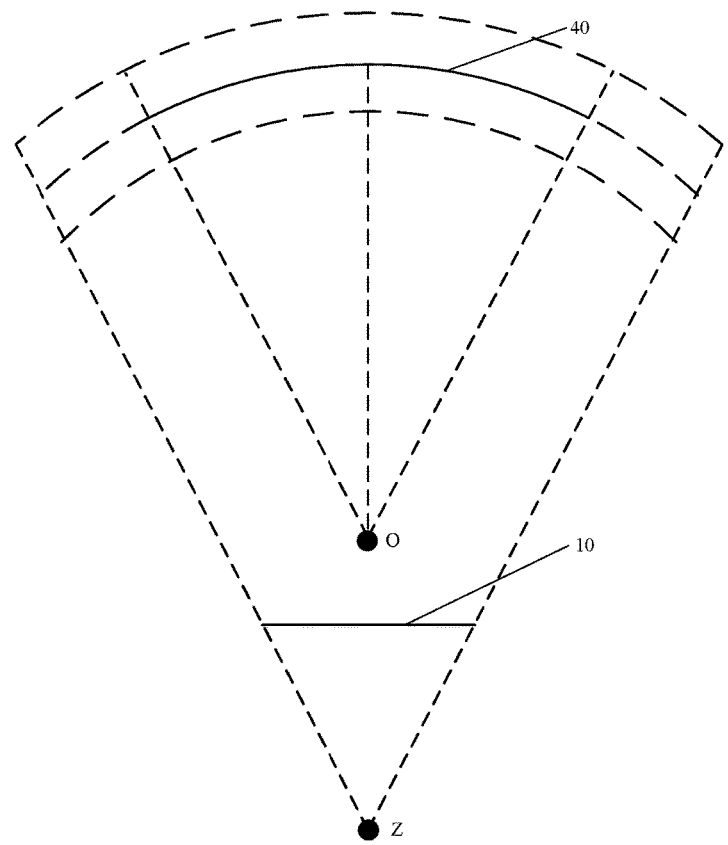
FIG. 15 is a diagram illustrating a third positional relationship among a viewer, a display device and a virtual screen.

Referring FIG. 15 for a third positional relationship among the viewer Z, the display device 10 and the virtual screen 40, the viewer Z watches the frame displayed by the display device 10. The frame is projected on the virtual screen 40 behind the display device 10. The virtual screen 40 is a curved-surface virtual screen. The virtual screen 40 has a circle center. The display device 10 is located at a side of the circle center of the virtual screen 40 away from the virtual screen 40.

It should be noted that, for the first positional relationship among the viewer Z, the display device 10 and the virtual screen 40, the second positional relationship among the viewer Z, the display device 10 and the virtual screen 40 and the third positional relationship among the viewer Z, the display device 10 and the virtual screen 40, when the distance between the viewer Z and the display device 10 is constant, for the display device 10 of the same size, with the same position of the central area A of the view field, the grating periods at respective positions of the display device 10 may be set with the same preset value.

It should be noted that, in practical application, in the above embodiments, the dispositions of the grating layer 30, the arrangements of the pixels and the positional relationships among the viewer Z, the display device 10 and the virtual screen 40 may be arbitrarily combined. For example, it is possible to combine the first disposition of the grating layer 30, the first arrangement of the pixels, and the first positional relationship among the viewer Z, the display device 10 and the virtual screen 40. Alternatively, it is possible to combine the first disposition of the grating layer 30, the second arrangement of the pixels, and the first positional relationship among the viewer Z, the display device 10 and the virtual screen 40. Alternatively, it is possible to combine the first disposition of the grating layer 30, the second arrangement of the pixels, and the second positional relationship among the viewer Z, the display device 10 and the virtual screen 40, and so on, to adapt the different application requirements of the display device 10, and implement different display of the display device 10. For example, it may implement curved-surface virtual display, a spherical-surface virtual display, and the like.

In the above embodiments, by setting the grating periods of the respective regions of the grating layer 30 such that the grating period of R grating region 33 gradually decreases along a direction from the center of the central area A of the view field directing to the non-central area B of the view field, the grating period of G grating region 34 gradually decreases along a direction from the center of the central area A of the view field directing to the non-central area B of the view field, and the grating period of B grating region 35 gradually decreases along a direction from the center of the central area A of the view field directing to the non-central area B of the view field, each of the red lights, green lights and blue lights emitted from respective positions of the display device 10 may be deflected toward the sight line of the viewer Z, and thus each of the lights emitted from respective positions of the display device 10 may be deflected toward the sight line of the viewer Z and deflected along the straight line where the position of the viewer Z, the position on the virtual screen 40 and the position on the display device 10 corresponding to the position on the virtual screen 40 are located, thus improving the on-site effect of the display of the display device 10 and the viewer Z's sense of immersion. Then, it may improve the viewing experience of the viewer Z, and bring a more realistic and comfortable viewing experience for the viewer Z.

In practical application, generally, the light emitted from the central area A of the view field of the display device 10 may be regarded as being directed straightly to the eyes of the viewer Z, that is, the light emitted from the central area A of the view field of the display device 10 and directed straightly to the eyes of the viewer Z may be regarded as a 0-order diffracted light obtained after the incident light being diffracted at a position of the grating layer 30 corresponding to the central area A of the view field. The light emitted from the non-central area B of the view field of the display device 10 requires deflection before the light is incident to the eyes of the viewer Z. That is, the light emitted from the non-central area B of the view field of the display device 10 and directed straightly to the eyes of the viewer Z may be regarded as a non-0-order diffracted light obtained after the incident light being diffracted at a position of the grating layer 30 corresponding to the non-central area B of the view field. Therefore, the intensity of the light emitted from the central area A of the view field of the display device 10 and directed straightly to the eyes of the viewer Z may be larger than that of the light emitted from the non-central area B of the view field of the display device 10 and directed straightly to the eyes of the viewer Z. In order to further improve the on-spot effect of the display of the display device 10 and the viewer Z's sense of immersion, improve the viewing experience of the viewer Z, and bring a more realistic and comfortable viewing experience for the viewer Z, the intensity of the light emitted from the non-central area B of the view field of the display device 10 and directed straightly to the eyes of the viewer Z needs to be improved. That is, the intensity of the 0-order diffracted light obtained after the incident light being diffracted at a position of the grating layer 30 corresponding to the central area A of the view field, and the intensity of the non-0-order diffracted light obtained after the incident light being diffracted at a position of the grating layer 30 corresponding to the non-central area B of the view field are adjusted respectively, such that the intensity of the light emitted from the central area A of the view field of the display device 10 and directed straightly to the eyes of the viewer Z is matched with that of the light emitted from the non-central area B of the view field of the display device 10 and directed straightly to the eyes of the viewer Z.

In the display device 10 provided in the embodiments of the present disclosure, a grating layer 30 is provided. The light incident on the grating layer 30 may be diffracted and interfered at the grating layer 30. The $k^{th}$ order diffraction obtained by the incident light being diffracted at the grating layer 30 may have a constructive interference or a destructive interference, which is related to the thickness of the grating protrusion 31 of the grating layer 30. Therefore, the thickness of the grating protrusion 31 of the grating layer 30 may be set to cause a certain order diffraction to have a constructive interference or destructive interference, to further adjust the intensity of the $k^{th}$ order diffraction. The intensities of the lights emitted from respective positions of the display device 10 and directed to the eyes of the viewer Z may be adjusted such that the lights emitted from respective positions of the display device 10 and directed to the eyes of the viewer Z have matching quantities and intensities, to further improve the viewing experience of the viewer Z, and bring a more realistic and comfortable viewing experience for the viewer Z.

Generally, when the grating period and the grating duty ratio of the grating layer 30 are constant, the refractive index of the grating protrusion 31 of the grating layer 30 is $n_G$. The filling material inside the gap 32 between two adjacent grating protrusions 31 has a refractive index $n_S$. The wavelength of the incident light on the grating layer 30 is $\lambda$. When the thickness h of the grating layer 30 is $$h = \frac{m\lambda}{|n_G - n_S|},$$

and m is a semi-integer, the 0 order diffraction obtained by the incident light being diffracted by the grating layer 30 has a destructive interference, and the $1^{st}$ order diffraction obtained by the incident light being diffracted by the grating layer 30 has a constructive interference. When the thickness h of the grating layer 30 is $$h = \frac{m\lambda}{|n_G - n_S|},$$

and m is an integer, the 0 order diffraction obtained by the incident light being diffracted by the grating layer 30 has a constructive interference, and the $1^{st}$ order diffraction obtained by the incident light being diffracted by the grating layer 30 has a destructive interference.

Figure 16:
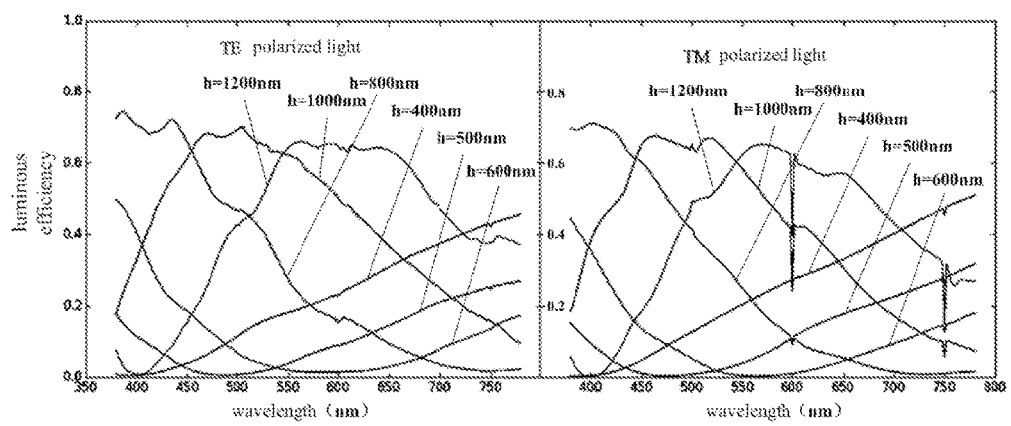
FIG. 16 is a graph illustrating a relationship between the luminous efficiency of the 0-order diffraction and the thickness of the grating protrusion.
Figure 17:
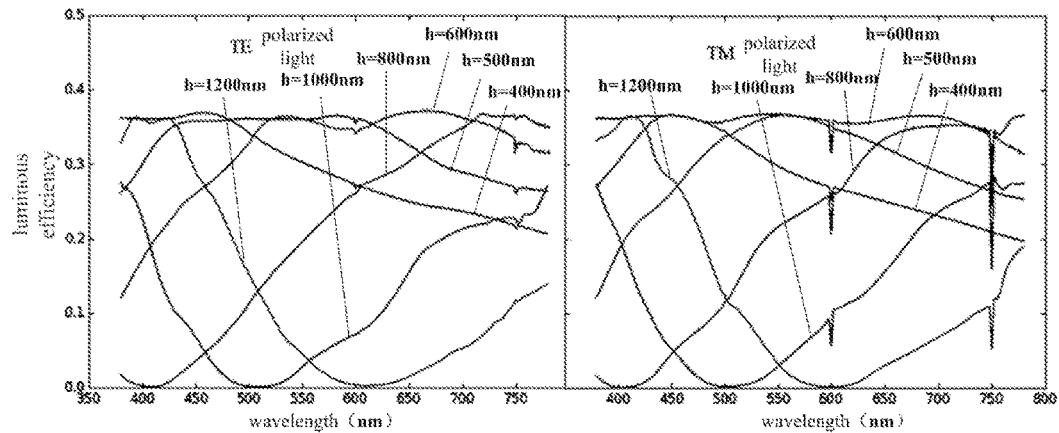
FIG. 17 is a graph illustrating a relationship between the luminous efficiency of the 1st order diffraction and the thickness of the grating protrusion.

For example, referring to FIGS. 16 and 17, when the grating period of the grating layer 30 is 3 μm and the grating duty ratio of the grating layer 30 is 0.5, the relationship between the luminous efficiency of the 0-order diffraction obtained by the incident light on the grating layer 30 being diffracted by the grating layer 30 and the thickness of the grating protrusion 31 of the grating layer 30 is shown in FIG. 16; and the relationship between the luminous efficiency of the $1^{st}$ order diffraction obtained by the incident light on the grating layer 30 being diffracted by the grating layer 30 and the thickness of the grating protrusion 31 of the grating layer 30 is shown in FIG. 17. As can be seen from FIGS. 16 and 17, when m is an integer, for example, when m is 1, constructive interference occurs for the 0-order diffraction, and destructive interference occurs for the $1^{st}$ order diffraction. When m is a semi-integer, for example, when m is ½, destructive interference occurs for the 0-order diffraction, and constructive interference occurs for the $1^{st}$ order diffraction.

That is, the intensities of the lights emitted from respective positions of the display device 10 and directed straightly to the eyes of the viewer Z are related to the thickness of the grating protrusion 31 of the grating layer 30. Moreover, according to the above conclusions, the thicknesses of the grating protrusions 31 of respective regions of the grating layer 30 may be set to adjust the intensities of the 0-order diffraction and non-0-order diffraction at respective positions of the display device 10, and in turn, to adjust the intensities of the lights emitted from respective positions of the display device 10 and directed straightly to the eyes of the viewer Z. For example, the non-0-order diffraction obtained by the incident light being diffracted by the region of the grating layer 30 corresponding to the non-central area B of the view field is adjusted to have constructive interference, and the 0-order diffraction obtained by the incident light being diffracted by the region of the grating layer 30 corresponding to the non-central area B of the view field is adjusted to have destructive interference, such that the intensities of the lights emitted from respective positions of the display device 10 and directed straightly to the eyes of the viewer Z are matched with one another.

In an embodiment of the present disclosure, for example, the 0-order diffraction and the $1^{st}$ order diffraction obtained by the incident light being diffracted by the grating layer 30 are controlled separately. For the viewer Z, the light emitted from the central area A of the view field of the display device 10 may be regarded as being directed straightly to the eyes of the viewer Z, and the light emitted from the non-central area B of the view field of the display device 10 requires deflection before the light is directed straightly to the eyes of the viewer Z. Therefore, within the central area A of the view field of the display device 10, the control is mainly directed to the 0-order diffraction obtained by the incident light being diffracted by the grating layer 30, and within the non-central area B of the view field of the display device 10, the control is mainly directed to the $1^{st}$ order diffraction obtained by the incident light being diffracted by the grating layer 30.

Specifically, generally, it may be assumed that the incident light on the grating layer 30 is incident perpendicular to the grating layer 30. That is, the incident light incident on the grating layer 30 is a collimated incident light. The incident angle $\theta_0$ of the incident light incident on the grating layer 30 is 0°. For example, when the display device 10 is a liquid crystal display device, the display device 10 includes a display panel 20 and a back light source. The back light source provides a surface light source for the display panel 20. When the surface light source supplies a light incident on the display panel 20, the light is generally incident perpendicular to the display panel 20. When the grating layer 30 is disposed inside or outside the display panel 20, the light is also incident perpendicular to the grating layer 30.

The grating layer 30 includes a plurality of grating protrusions 31. The grating protrusions 31 located within the region corresponding to the non-central area B of the view field has a thickness $h_B$ satisfying the following equation:

$$h_B = \frac{m_B \lambda}{|n_{GB} - n_{SB}|} \qquad (2)$$

Where $n_{GB}$ denotes a refractive index of the grating protrusion 31 located in a region corresponding to the non-central area B of the view field, $n_{SB}$ denotes a refractive index of filling material inside the gap 32 between two adjacent grating protrusions 31 located in a region corresponding to the non-central area B of the view field, λ denotes a wavelength of the incident light incident on the grating layer 30, $m_B$ denotes a second constant, and the second constant $m_B$ satisfies: $m_B = j + ½$, j=0, 1, 2, 3, 4 . . . .

When the thickness $h_B$ of the protrusion 31 located within the region corresponding to the non-central area B of the view field satisfies the equation (2), constructive interference occurs for the $1^{st}$ order diffraction obtained by the incident light being diffracted at the region of the grating layer 30 corresponding to the non-central area B of the view field, such that the intensity of the $1^{st}$ order diffraction obtained by the incident light being diffracted at the R grating region 33 within the region corresponding to the non-central area B of the view field is enhanced, the intensity of the $1^{st}$ order diffraction obtained by the incident light being diffracted at the G grating region 34 within the region corresponding to the non-central area B of the view field is enhanced, and the intensity of the $1^{st}$ order diffraction obtained by the incident light being diffracted at the B grating region 35 within the region corresponding to the non-central area B of the view field is enhanced, thus the intensity of the $1^{st}$ order diffraction obtained by the incident light being diffracted at the region of the grating layer 30 corresponding to the non-central area B of the view field is enhanced. Then, the intensities of the lights emitted from respective positions of the display device 10 and directed straightly to the eyes of the viewer Z may be matched with one another, the luminance difference in the frame seen by the viewer Z may be reduced, and the uniformity of the luminance in the frame seen by the viewer Z may be improved. Further, it may improve the viewing experience of the viewer Z, and bring a more realistic and comfortable viewing experience for the viewer Z.

The grating protrusion 31 located within the region corresponding to the central area A of the view field has a thickness $h_A$ satisfying the following equation:

$$h_A = \frac{m_A \lambda}{|n_{GA} - n_{SA}|} \quad (3)$$

Where $n_{GA}$ denotes a refractive index of the grating protrusion 31 located in a region corresponding to the central area A of the view field, $n_{SA}$ denotes a refractive index of filling material inside the gap 32 between two adjacent grating protrusions 31 located in a region corresponding to the central area A of the view field, $\lambda$ denotes a wavelength of the incident light incident on the grating layer 30, $m_A$ denotes a first constant, and the first constant $m_A$ satisfies: $i-\frac{1}{2}<m_A<i+\frac{1}{2}$, $i=1, 2, 3, 4 \ldots$.

In the equation (3), the first constant $m_A$ satisfies: $i-\frac{1}{2}<m_A<i+\frac{1}{2}$. That is, the first constant $m_A$ is not a semi-integer. In this case, destructive interference occurs for the $1^{st}$ order diffraction obtained by the incident light being diffracted within the region of the grating layer 30 corresponding to the central area A of the view field, and not for the 0-order diffraction obtained by the incident light being diffracted within the region of the grating layer 30 corresponding to the central area A of the view field. That is, when the thickness $h_B$ of the grating protrusion 31 located within the region corresponding to the central area A of the view field satisfies the equation (2), the intensity of the light of 0-order diffraction obtained by the incident light being diffracted within the R grating region 33 corresponding to the central area A of the view field may be adjusted, the intensity of the light of 0-order diffraction obtained by the incident light being diffracted within the G grating region 34 corresponding to the central area A of the view field may be adjusted, and the intensity of the light of 0-order diffraction obtained by the incident light being diffracted within the B grating region 35 corresponding to the central area A of the view field may be adjusted, to adjust the intensities of the lights emitted from the central area A of the view field of the display device 10 and directed straightly to the eyes of the viewer Z. It may improve the uniformity of the luminance in the frame seen by the viewer Z. Further, it may improve the viewing experience of the viewer Z, and bring a more realistic and comfortable viewing experience for the viewer Z.

In the above embodiment, the first constant $m_A$ may be an integer or a non-integer, and the value of the first constant may be taken according to the actual demand. For example, when a difference between the intensity of the 0-order diffraction obtained by the incident light being diffracted within the region of the grating layer 30 corresponding to the central area A of the view field and the intensity of the $1^{st}$ order diffraction obtained by the incident light being diffracted within the region of the grating layer 30 corresponding to the non-central area B of the view field is small, the first constant $m_A$ may take an integer, such that constructive interference occurs for the 0-order diffraction obtained by the incident light being diffracted within the region of the grating layer 30 corresponding to the central area A of the view field. At this time, the intensity of the light of the 0-order diffraction obtained by the incident light being diffracted within the region of the grating layer 30 corresponding to the central area A of the view field is the maximum. Alternatively, the first constant $m_A$ may take a non-integer, and the value of the first constant $m_A$ may approximate to an integer. For example, when i is 1 and $0.5<m_A<1$, the first constant $m_A$ may take values of 0.85, 0.9 or 0.95 and so on; when i is 1 and $1<m_A<1.5$, the first constant $m_A$ may take values of 1.05, 1.1 or 1.15 and so on.

When a difference between the intensity of the 0-order diffraction obtained by the incident light being diffracted within the region of the grating layer 30 corresponding to the central area A of the view field and the intensity of the $1^{st}$ order diffraction obtained by the incident light being diffracted within the region of the grating layer 30 corresponding to the non-central area B of the view field is large, the first constant $m_A$ may take a non-integer, and the first constant $m_A$ may preferably take a semi-integer. That is, the first constant $m_A$ satisfies $i-\frac{1}{2}<m_A<i$, $i=1, 2, 3, 4 \ldots$, or $i<m_A<i+\frac{1}{2}$, $i=1, 2, 3, 4 \ldots$. For example, when i is 1 and $0.5<m_A<1$, the first constant $m_A$ may take values of 0.55, 0.58 or 0.6 and so on, when i is 1 and $1<m_A<1.5$, the first constant $m_A$ may take values of 1.4, 1.43 or 1.46 and so on.

By setting the value of the first constant $m_A$, it is possible to cause the 0-order diffraction obtained by the incident light being diffracted within the region of the grating layer 30 corresponding to the central area A of the view field not to have a complete constructive interference, such that the intensity of the light emitted from the non-central area B of the view field of the display device 10 and directed straightly to the eyes of the viewer Z and the intensity of the light emitted from the central area A of the view field of the display device 10 and directed straightly to the eyes of the viewer Z may be matched with each other.

In the above embodiment, the display panel 20 includes a plurality of R pixels 24, a plurality of G pixels 25, and a plurality of B pixels 26. The grating layer 30 includes an R grating region 33 corresponding to the R pixel 24, a G grating region 34 corresponding to the G pixel 25, and a B grating region 35 corresponding to the B pixel 26. When setting the thickness of the grating protrusion 31 within the region of the R grating region 33 corresponding to the central area A of the view field, the wavelength $\lambda$ of the incident light incident on the grating layer 30 is the wavelength of the red light and the wavelength of the red light is 630 nm. When setting the thickness of the grating protrusion 31 within the region of the G grating region 34 corresponding to the central area A of the view field, the wavelength $\lambda$ of the incident light incident on the grating layer 30 is the wavelength of the green light and the wavelength of the green light is 550 nm. When setting the thickness of the grating protrusion 31 within the region of the B grating region 35 corresponding to the central area A of the view field, the wavelength $\lambda$ of the incident light incident on the grating layer 30 is the wavelength of the blue light and the wavelength of the blue light is 430 nm.

In the above embodiment, there is a difference between $n_{GA}$ and $n_{SA}$, and the values of the $n_{GA}$ and $n_{SA}$ may be set according to the actual application. For example, the relationship between $n_{GA}$ and $n_{SA}$ may satisfy: $n_{GA}<n_{SA}$, or $n_{GA}>n_{SA}$. In an embodiment of the present disclosure, the relationship between $n_{GA}$ and $n_{SA}$ satisfies: $n_{GA}>n_{SA}$, for example, $n_{GA}=1.5$ and $n_{SA}=1$. That is, the refractive index of the material of the grating protrusion 31 located in the region corresponding to the central area A of the view field is 1.5, and the refractive index of the filling material inside the gap 32 between two adjacent grating protrusions 31 within the region corresponding to the central area A of the view field is 1. When the grating layer 30 is located outside the display panel 20, the filling material between two adjacent grating protrusions 31 within the region corresponding to the central area A of the view field may be air.

In the above embodiment, there is a difference between $n_{GB}$ and $n_{SB}$, and the values of the $n_{GB}$ and $n_{SB}$ may be set according to the actual application. For example, the relationship between $n_{GB}$ and $n_{SB}$ may satisfy: $n_{GB}<n_{SB}$, or $n_{GB} > n_{SB}$. In an embodiment of the present disclosure, the relationship between $n_{GB}$ and $n_{SB}$ satisfies: $n_{GB} > n_{SB}$. For example, $n_{GB} = 1.5$ and $n_{SB} = 1$. That is, the refractive index of the material of the grating protrusion 31 located in the region corresponding to the non-central area B of the view field is 1.5, and the refractive index of the filling material inside the gap 32 between two adjacent grating protrusions 31 within the region corresponding to the non-central area B of the view field is 1. When the grating layer 30 is located outside the display panel 20, the filling material between two adjacent grating protrusions 31 within the region corresponding to the non-central area B of the view field may be air.

In the equation (2), when the values of $n_{GB}$, $n_{SB}$ and $\lambda$ are determined, the larger the value of the second constant $m_B$ is, the larger the thickness $h_B$ of the grating protrusion 31 within the region corresponding to the non-central area B of the view field is. Since production of a thicker grating protrusion 31 generally takes more processes and time, the production cost of the display device 10 is higher, and it is less favorable for a thin design of the display device 10. Therefore, in order to reduce the production cost of the display device 10 and to facilitate a thin design of the display device 10, in an embodiment of the present disclosure, the second constant $m_B$ satisfies: $m_B = 0.5$, to reduce the thickness $h_B$ of the grating protrusion 31 within the region corresponding to the non-central area B of the view field, so as to reduce the production cost of the display device 10 and to facilitate a thin design of the display device 10.

In the equation (3), when the values of $n_{GA}$, $n_{SA}$ and $\lambda$ are determined, the larger the value of the first constant $m_A$ is, the larger the thickness $h_A$ of the grating protrusion 31 within the region corresponding to the central area A of the view field is. Since production of a thicker grating protrusion 31 generally takes more processes and time, the production cost of the display device 10 is higher, and it is less favorable for a thin design of the display device 10. Therefore, in order to reduce the production cost of the display device 10 and to facilitate a thin design of the display device 10, in an embodiment of the present disclosure, the first constant $m_A$ satisfies: $0.5 < m_A < 1.5$, and preferably the first constant $m_A$ satisfies: $0.5 < m_A \leq 1$, to reduce the thickness $h_A$ of the grating protrusion 31 within the region corresponding to the central area A of the view field, so as to reduce the production cost of the display device 10 and to facilitate a thin design of the display device 10.

In the above embodiment, the display device 10 includes a plurality of R pixels 24, a plurality of G pixels 25, and a plurality of B pixels 26. The grating layer 30 includes an R grating region 33 corresponding to the R pixel 24, a G grating region 34 corresponding to the G pixel 25, and a B grating region 35 corresponding to the B pixel 26.

When setting the thickness of the grating protrusion 31 within the region of the R grating region 33 corresponding to the non-central area B of the view field, the wavelength $\lambda$ of the incident light incident on the grating layer 30 is the wavelength of the red light and the wavelength of the red light is 630 nm. According to the equation (2), when the second constant $m_B$ is 0.5, the thickness $h_{BR}$ of the grating protrusion 31 within the region of the R grating region 33 corresponding to the non-central area B of the view field is 630 nm. When setting the thickness of the grating protrusion 31 within the region of the G grating region 34 corresponding to the non-central area B of the view field, the wavelength $\lambda$ of the incident light incident on the grating layer 30 is the wavelength of the green light and the wavelength of the green light is 550 nm. According to the equation (2), when the second constant $m_B$ is 0.5, the thickness $h_{BG}$ of the grating protrusion 31 within the region of the G grating region 34 corresponding to the non-central area B of the view field is 630 nm. When setting the thickness of the grating protrusion 31 within the region of the B grating region 35 corresponding to the non-central area B of the view field, the wavelength $\lambda$ of the incident light incident on the grating layer 30 is the wavelength of the blue light and the wavelength of the blue light is 430 nm. According to the equation (2), when the second constant $m_B$ is 0.5, the thickness $h_{BB}$ of the grating protrusion 31 within the region of the B grating region 33 corresponding to the non-central area B of the view field is 430 nm.

When setting the thickness of the grating protrusion 31 within the region of the R grating region 33 corresponding to the central area A of the view field, the wavelength $\lambda$ of the incident light incident on the grating layer 30 is the wavelength of the red light and the wavelength of the red light is 630 nm. According to the equation (3), when the first constant $m_A$ is $0.5 < m_A < 1.5$, the thickness $h_{AR}$ of the grating protrusion 31 within the region of the R grating region 33 corresponding to the central area A of the view field satisfies: $315 \text{ nm} < h_{AR} < 945 \text{ nm}$. In practical application, when a difference between the intensity of the 0-order diffraction obtained by the incident light being diffracted within the region of the R grating region 33 corresponding to the central area A of the view field and the intensity of the $1^{st}$ order diffraction obtained by the incident light being diffracted within the region of the R grating region 33 corresponding to the non-central area B of the view field is small, the thickness $h_{AR}$ of the grating protrusion 31 within the region of the R grating region 33 corresponding to the central area A of the view field may be 630 nm. Alternatively, the thickness $h_{AR}$ of the grating protrusion 31 within the region of the R grating region 33 corresponding to the central area A of the view field takes a value approximating to 630 nm. For example, the thickness $h_{AR}$ of the grating protrusion 31 within the region of the R grating region 33 corresponding to the central area A of the view field may be 550 nm, 580 nm, 600 nm, 650 nm or 680 nm, and so on. When a difference between the intensity of the 0-order diffraction obtained by the incident light being diffracted within the region of the R grating region 33 corresponding to the central area A of the view field and the intensity of the $1^{st}$ order diffraction obtained by the incident light being diffracted within the region of the R grating region 33 corresponding to the non-central area B of the view field is large, preferably, the thickness $h_{AR}$ of the grating protrusion 31 within the region of the R grating region 33 corresponding to the central area A of the view field approximates to 315 nm. For example, the thickness $h_{AR}$ of the grating protrusion 31 within the region of the R grating region 33 corresponding to the central area A of the view field may be 330 nm, 370 nm or 400 nm and so on. Alternatively, the thickness $h_{AR}$ of the grating protrusion 31 within the region of the R grating region 33 corresponding to the central area A of the view field approximates to 945 nm. For example, the thickness $h_{AR}$ of the grating protrusion 31 of the R grating region 33 within the central area A of the view field may be 850 nm, 900 nm or 930 nm and so on.

When setting the thickness of the grating protrusion 31 within the region of the G grating region 34 corresponding to the central area A of the view field, the wavelength $\lambda$ of the incident light incident on the grating layer 30 is the wavelength of the green light and the wavelength of the green light is 550 nm. According to the equation (3), when the first constant $m_A$ is $0.5 < m_A < 1.5$, the thickness $h_{AG}$ of the grating protrusion 31 within the region of the G grating region 34 corresponding to the central area A of the view field satisfies: 275 nm<$h_{AG}$<825 nm. In practical application, when a difference between the intensity of the 0-order diffraction obtained by the incident light being diffracted within the region of the G grating region 34 corresponding to the central area A of the view field and the intensity of the $1^{st}$ order diffraction obtained by the incident light being diffracted within the region of the G grating region 34 corresponding to the non-central area B of the view field is small, the thickness $h_{AG}$ of the grating protrusion 31 within the region of the G grating region 34 corresponding to the central area A of the view field may be 550 nm. Alternatively, the thickness $h_{AG}$ of the grating protrusion 31 within the region of the G grating region 34 corresponding to the central area A of the view field takes a value approximating to 550 nm. For example, the thickness $h_{AG}$ of the grating protrusion 31 within the region of the G grating region 34 corresponding to the central area A of the view field may be 500 nm, 530 nm, 580 nm or 600 nm, and so on. When a difference between the intensity of the 0-order diffraction obtained by the incident light being diffracted within the region of the G grating region 34 corresponding to the central area A of the view field and the intensity of the $1^{st}$ order diffraction obtained by the incident light being diffracted within the region of the G grating region 34 corresponding to the non-central area B of the view field is large, preferably, the thickness $h_{AG}$ of the grating protrusion 31 within the region of the G grating region 34 corresponding to the central area A of the view field approximates to 275 nm. For example, the thickness $h_{AG}$ of the grating protrusion 31 within the region of the G grating region 34 corresponding to the central area A of the view field may be 300 nm, 320 nm or 350 nm and so on. Alternatively, the thickness $h_{AG}$ of the grating protrusion 31 within the region of the G grating region 34 corresponding to the central area A of the view field may approximate to 825 nm. For example, the thickness $h_{AG}$ of the grating protrusion 31 within the region of the G grating region 34 corresponding to the central area A of the view field may be 800 nm, 760 nm or 730 nm and so on.

When setting the thickness of the grating protrusion 31 within the region of the B grating region 35 corresponding to the central area A of the view field, the wavelength λ of the incident light incident on the grating layer 30 is the wavelength of the blue light and the wavelength of the blue light is 430 nm. According to the equation (3), when the first constant $m_A$ is 0.5<$m_A$<1.5, the thickness $h_{AB}$ of the grating protrusion 31 within the region of the B grating region 35 corresponding to the central area A of the view field satisfies: 215 nm<$h_{AB}$<645 nm. In practical application, when a difference between the intensity of the 0-order diffraction obtained by the incident light being diffracted within the region of the B grating region 35 corresponding to the central area A of the view field and the intensity of the $1^{st}$ order diffraction obtained by the incident light being diffracted within the region of the B grating region 35 corresponding to the non-central area B of the view field is small, the thickness $h_{AB}$ of the grating protrusion 31 within the region of the B grating region 35 corresponding to the central area A of the view field may be 430 nm. Alternatively, the thickness $h_{AB}$ of the grating protrusion 31 within the region of the B grating region 35 corresponding to the central area A of the view field takes a value approximating to 430 nm. For example, the thickness $h_{AB}$ of the grating protrusion 31 within the region of the B grating region 35 corresponding to the central area A of the view field may be 350 nm, 380 nm, 480 nm or 500 nm, and so on. When a difference between the intensity of the 0-order diffraction obtained by the incident light being diffracted within the region of the B grating region 35 corresponding to the central area A of the view field and the intensity of the $1^{st}$ order diffraction obtained by the incident light being diffracted within the region of the B grating region 35 corresponding to the non-central area B of the view field is large, preferably, the thickness $h_{AB}$ of the grating protrusion 31 within the region of the B grating region 35 corresponding to the central area A of the view field approximates to 215 nm. For example, the thickness $h_{AB}$ of the grating protrusion 31 within the region of the B grating region 35 corresponding to the central area A of the view field may be 250 nm, 280 nm or 300 nm and so on. Alternatively, the thickness $h_{AB}$ of the grating protrusion 31 within the region of the B grating region 35 corresponding to the central area A of the view field approximates to 645 nm. For example, the thickness $h_{AB}$ of the grating protrusion 31 within the region of the B grating region 35 corresponding to the central area A of the view field may be 620 nm, 6000 nm or 550 nm and so on.

Figure 18:
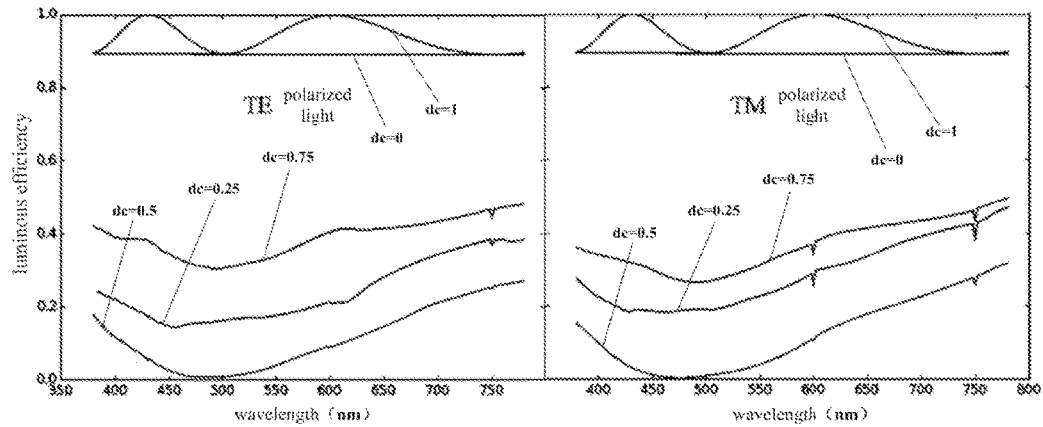
FIG. 18 is a graph illustrating a relationship between the luminous efficiency of the 0-order diffraction and the grating duty ratio.
Figure 19:
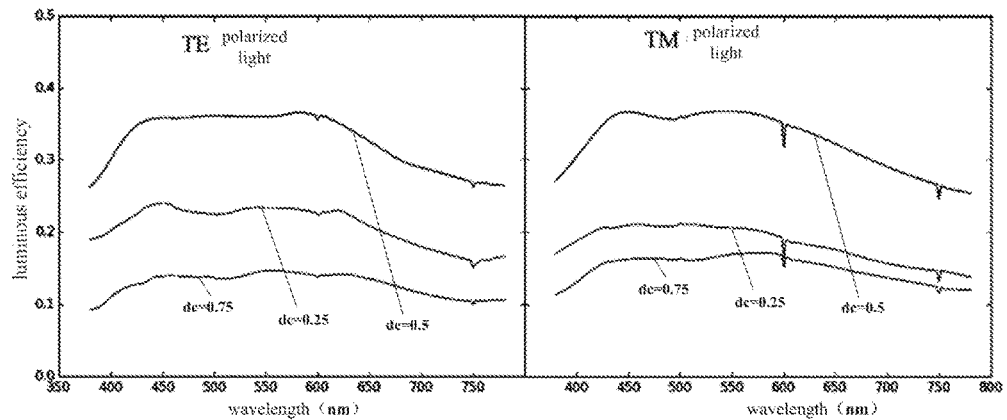
FIG. 19 is a graph illustrating a relationship between the luminous efficiency of the 1st order diffraction and the grating duty ratio.

In practical application, referring to FIGS. 18 and 19, when the grating period of the grating layer 30 is 3 μm, and the thickness of the grating protrusion 31 of the grating layer 30 is 500 nm, the relationship between the luminous efficiency of the 0-order diffraction obtained by the incident light on the grating layer 30 diffracted by the grating layer 30 and the grating duty ratio is shown in FIG. 18, and the relationship between the luminous efficiency of the $1^{st}$ order diffraction obtained by the incident light on the grating layer 30 diffracted by the grating layer 30 and the grating duty ratio is shown in FIG. 19. It may be seen from FIG. 18 that, for the 0-order diffraction, when the grating duty ratio is 0.5, the intensity of the 0-order diffraction is the smallest. When the grating duty ratio is less than 0.5, the intensity of the 0-order diffraction decreases with the increase of the grating duty ratio. When the grating duty ratio is more than 0.5, the intensity of the 0-order diffraction increases with the decrease of the grating duty ratio. It may be seen from FIG. 19 that, for the $1^{st}$ order diffraction, when the grating duty ratio is 0.5, the intensity of the $1^{st}$ order diffraction is the largest. When the grating duty ratio is less than 0.5, the intensity of the $1^{st}$ order diffraction increases with the increase of the grating duty ratio. When the grating duty ratio is more than 0.5, the intensity of the $1^{st}$ order diffraction decreases with the decrease of the grating duty ratio.

That is, the intensities of the lights emitted from respective positions of the display device 10 are also related to the grating duty ratio of the grating layer 30. Moreover, according to the above conclusion, the grating duty ratio of the grating layer 30 may be set to increase the intensity of the non-0-order diffraction obtained by the incident light diffracted in a region of the grating layer 30 corresponding to the non-central area B of the view field, and in turn, to increase the intensity of the light emitted from the non-central area B of the view field of the display device 10 and directed straightly to the eyes of the viewer Z, and when necessary, to properly decrease the intensity of the 0-order diffraction obtained by the incident light diffracted in a region of the grating layer 30 corresponding to the central area A of the view field, and thus to properly decrease the intensity of the light emitted from the central area A of the view field of the display device 10 and directed straightly to the eyes of the viewer Z, such that the light emitted from the non-central area B of the view field of the display device 10 and directed straightly to the eyes of the viewer Z may be matched with the intensity of the light emitted from the central area A of the view field of the display device 10 and directed straightly to the eyes of the viewer Z.

Specifically, within a region corresponding to the central area A of the view field, the grating duty ratio $dc_A$ of the grating layer 30 satisfies: $0.2 \leq dc_A \leq 0.8$; within a region corresponding to the non-central area B of the view field, the grating duty ratio $dc_B$ of the grating layer 30 is 0.5. In a specific implementation, within the region corresponding to the central area A of the view field, each of the grating duty ratio of the R grating region 33, the grating duty ratio of the G grating region 34 and the grating duty ratio of the B grating region 35 is between 0 and 1. Within the region corresponding to the non-central area B of the view field, each of the grating duty ratio of the R grating region 33, the grating duty ratio of the G grating region 34 and the grating duty ratio of the B grating region 35 is 0.5.

In an embodiment of the present disclosure, within a region of the grating layer 30 corresponding to the non-central area B of the view field, the grating duty ratio $dc_B$ of the grating layer 30 is set to 0.5. Therefore, in the region corresponding to the non-central area B of the view field, when the grating period of the grating layer 30 and the thickness of the grating protrusion 31 of the grating layer 30 are constant, the intensity of the 1st order diffraction obtained by the incident light diffracted in the region of the grating layer 30 corresponding to the non-central area B of the view field is the largest, such that the light emitted from the non-central area B of the view field of the display device 10 and directed straightly to the eyes of the viewer Z has a large intensity, so as to match the intensity of the light emitted from the non-central area B of the view field of the display device 10 and directed straightly to the eyes of the viewer Z with the intensity of the light emitted from the central area A of the view field of the display device 10 and directed straightly to the eyes of the viewer Z.

In an embodiment of the present disclosure, within the region corresponding to the central area A of the view field, the grating duty ratio $dc_A$ of the grating layer 30 satisfies: $0.2 \leq dc_A \leq 0.8$. In practical application, within the region corresponding to the central area A of the view field, the value of the grating duty ratio $dc_A$ of the grating layer 30 may be set according to actual demand. For example, when the difference between the intensity of the light emitted from the non-central area B of the view field of the display device 10 and directed straightly to the eyes of the viewer Z and the intensity of the light emitted from the central area A of the view field of the display device 10 and directed straightly to the eyes of the viewer Z is large, within the region corresponding to the central area A of the view field, the grating duty ratio $dc_A$ of the grating layer 30 may take a value of 0.5. In this case, within the region corresponding to the central area A of the view field, when the grating period of the grating layer 30 and the thickness of the grating protrusion 31 of the grating layer 30 are constant, the intensity of the 0-order diffraction obtained by the incident light diffracted in the region of the grating layer 30 corresponding to the central area A of the view field is the smallest. Therefore, the intensity of the 0-order diffraction obtained by the incident light diffracted in the region of the grating layer 30 corresponding to the central area A of the view field may be properly decreased, such that the intensity of the light emitted from the non-central area B of the view field of the display device 10 and directed straightly to the eyes of the viewer Z may be matched with the intensity of the light emitted from the central area A of the view field of the display device 10 and directed straightly to the eyes of the viewer Z.

When the difference between the intensity of the light emitted from the non-central area B of the view field of the display device 10 and directed straightly to the eyes of the viewer Z and the intensity of the light emitted from the central area A of the view field of the display device 10 and directed straightly to the eyes of the viewer Z is small, within the region corresponding to the central area A of the view field, the grating duty ratio $dc_A$ of the grating layer 30 may satisfy: $0.2 \leq dc_A < 0.5$, or $0.5 < dc_A \leq 0.8$. For example, the grating duty ratio $dc_A$ of the grating layer 30 may take a value of 0.2, 0.3, 0.4, 0.6, 0.7 or 0.8. In this case, within the region corresponding to the central area A of the view field, when the grating period of the grating layer 30 and the thickness of the grating protrusion 31 of the grating layer 30 are constant, the intensity of the 0-order diffraction obtained by the incident light diffracted in the region of the grating layer 30 corresponding to the central area A of the view field is not the smallest, and the intensity of the 0-order diffraction obtained by the incident light diffracted in the region of the grating layer 30 corresponding to the central area A of the view field is not the largest. Therefore, the intensity of the light emitted from the non-central area B of the view field of the display device 10 and directed straightly to the eyes of the viewer Z may be matched with the intensity of the light emitted from the central area A of the view field of the display device 10 and directed straightly to the eyes of the viewer Z.

In the above embodiment, the grating protrusion 31 may be a transparent grating or a non-transparent grating, and the material of the grating protrusion 31 may be selected in a variety of ways. In an embodiment of the present disclosure, the grating protrusion 31 is a transparent grating, and the grating protrusion 31 is a polymethylmethacrylate grating protrusion.

Referring to FIGS. 20 to 25, the shape of the cross-sectional of the grating protrusion 31 is a step shape, a trapezoidal shape or a triangular shape.

Figure 20:
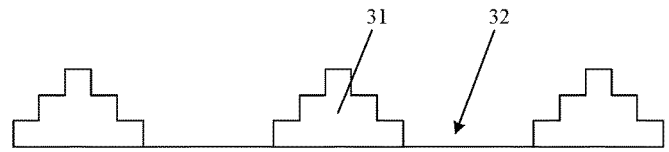
FIG. 20 is a first cross-sectional view of the grating protrusion.
Figure 21:
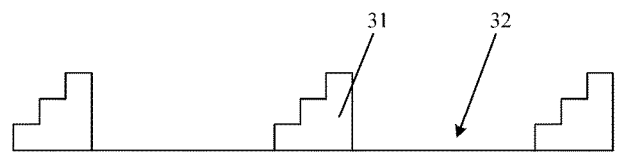
FIG. 21 is a second cross-sectional view of the grating protrusion.

For example, referring to FIGS. 20 and 21, the grating layer 30 includes a plurality of grating protrusions 31. A gap 32 exists between two adjacent grating protrusions 31. When the grating protrusion 31 is cut across by a plane perpendicular to the extending direction of the gap 32 between two adjacent grating protrusions 31, the shape of the cross sectional area of the grating protrusions 31 is a step shape. In practical application, as shown in FIG. 21, it is possible that one side of the cross sectional area of the grating protrusions 31 is in a step shape. Alternatively, as shown in FIG. 20, it is possible that two sides of the cross sectional area of the grating protrusions 31 are in step shapes. When the two sides of the cross sectional area of the grating protrusions 31 are in step shapes, the step shapes at the two sides of the cross sectional area of the grating protrusions 31 may be symmetric with respect to the central line of the cross sectional area of the grating protrusion 31 perpendicular to the light incident plane of the grating protrusion 31. Or, the step shapes at the two sides of the cross sectional area of the grating protrusions 31 may be asymmetric with respect to the central line of the cross sectional area of the grating protrusion 31 perpendicular to the light incident plane of the grating protrusion 31.

Figure 22:
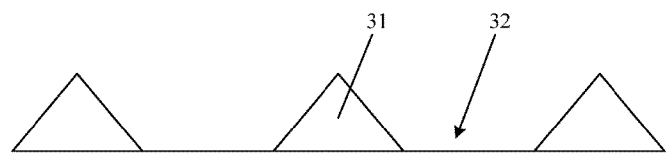
FIG. 22 is a third cross-sectional view of the grating protrusion.
Figure 23:
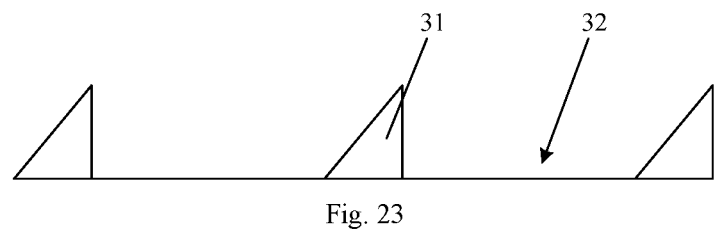
FIG. 23 is a fourth cross-sectional view of the grating protrusion.

Referring to FIGS. 22 and 23, the grating layer 30 includes a plurality of grating protrusions 31. A gap 32 exists between two adjacent grating protrusions 31. When the grating protrusion 31 is cut across by a plane perpendicular to the extending direction of the gap 32 between two adjacent grating protrusions 31, the shape of the cross sectional area of the grating protrusions 31 is a triangular shape. In practical application, as shown in FIG. 22, the two sides of the cross sectional area of the grating protrusions 31 may be symmetric with respect to the central line of the cross sectional area of the grating protrusion 31 perpendicular to the light incident plane of the grating protrusion 31. In this case, the shape of the cross sectional area of the grating protrusion 31 is an isosceles triangle. Or, as shown in FIG. 23, the two sides of the cross sectional area of the grating protrusions 31 may be asymmetric with respect to the central line of the cross sectional area of the grating protrusion 31 perpendicular to the light incident plane of the grating protrusion 31.

Figure 24:
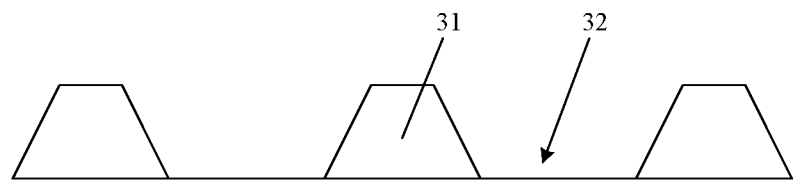
FIG. 24 is a fifth cross-sectional view of the grating protrusion.
Figure 25:
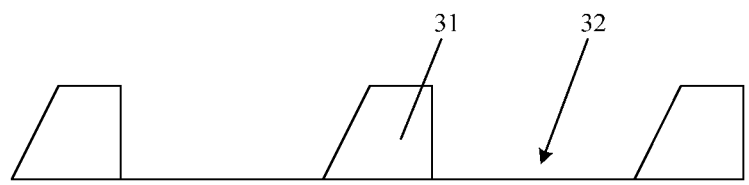
FIG. 25 is a sixth cross-sectional view of the grating protrusion.

Referring to FIGS. 24 and 25, the grating layer 30 includes a plurality of grating protrusions 31. A gap 32 exists between two adjacent grating protrusions 31. When the grating protrusion 31 is cut across by a plane perpendicular to the extending direction of the gap 32 between two adjacent grating protrusions 31, the shape of the cross sectional area of the grating protrusions 31 is a trapezoidal shape. In practical application, as shown in FIG. 24, the two sides of the cross sectional area of the grating protrusions 31 may be symmetric with respect to the central line of the cross sectional area of the grating protrusion 31 perpendicular to the light incident plane of the grating protrusion 31. In this case, the shape of the cross sectional area of the grating protrusion 31 is an isosceles trapezoid. Or, as shown in FIG. 25, the two sides of the cross sectional area of the grating protrusions 31 may be asymmetric with respect to the central line of the cross sectional area of the grating protrusion 31 perpendicular to the light incident plane of the grating protrusion 31.

Since the shape of the cross sectional area of the grating protrusion 31 is a step shape, a triangular shape or a trapezoidal shape, the light exit surface of each grating protrusion 31 is not parallel to the light incident plane of the grating protrusion 31. When the incident light incident on the grating protrusion 31 passes through the grating layer 30, the incident light occurs diffractions and interferences for a plurality of times, to increase the effect of the diffraction and interference of the incident light with the grating layer 30, and enhance the ability of adjustment to the light exit directions of respective positions of the display device 10, such that the lights emitted from the respective positions of the display device 10 are deflected toward the sight of the viewer Z, and deflected along a straight line where the position of the viewer Z, the position on the virtual screen 40 and the position on the display device 10 corresponding the position on the virtual screen 40 are located. At the same time, the quantities and intensities of the light emitted from the respective positions of the display device 10 and directed straightly to the eyes of the viewer Z may be improved. Thus, the propagation of the light within the display device 10 may be better controlled, and it may improve the viewing experience of the viewer Z, and bring a more realistic and comfortable viewing experience for the viewer Z.

It should be noted that, when the two sides of the cross sectional area of the grating protrusions 31 is asymmetric with respect to the central line of the cross sectional area of the grating protrusion 31, when the incident light incident on the grating layer 30 passes through the grating layer 30, the incident light may be diffracted and interfered with the grating layer 30, to obtain a $k^{th}$ order of diffraction with diffraction angles and intensities asymmetric with respect to the 0 order diffraction. By providing the two sides of the cross sectional area of the grating protrusions 31 asymmetric with respect to the central line of the cross sectional area of the grating protrusion 31, the $k^{th}$ order of diffraction exiting away from the sight of the viewer has destructive diffraction and interference, and the $k^{th}$ order of diffraction exiting toward the sight of the viewer has constructive diffraction and interference. Therefore, it may further improve the control effect of the propagation of the light within the display device 10. Further, it may improve the viewing experience of the viewer Z, and bring a more realistic and comfortable viewing experience for the viewer Z.

Referring to FIG. 3, the display panel 20 includes a color film layer 23. The grating layer 30 is located at the light exit side of the color film layer 23 or at the light incident side of the color film layer 23. For example, as shown FIG. 3, the display panel 20 includes a first substrate 21, a second substrate 22, and a color film layer 23. The first substrate 21 is disposed opposite to the second substrate 22. The color film layer 23 is located between the first substrate 21 and the second substrate 22. The downward direction in FIG. 3 is the light exit direction of the display panel 20. The upper side of the color film layer 23 in FIG. 3 is the light incident side of the color film layer 23. The lower side of the color film layer 23 in FIG. 3 is the light exit side of the color film layer 23. The grating layer 30 may be located at the light exit side of the color film layer 23. For example, the grating layer 30 may be located between the color film layer 23 and the second substrate 22, or, the grating layer 30 may be located on the side of the second substrate 22 away from the color film layer 23. Alternatively, the grating layer 30 may be located at the light incident side of the color film layer 23. For example, the grating layer 30 may be located between the color film layer 23 and the first substrate 21, or, the grating layer 30 may be located on the side of the first substrate 21 away from the color film layer 23.

Still referring to FIG. 3, in an embodiment of the present disclosure, the grating layer 30 is located at the exit side of the color film layer 23, and the grating layer 30 contacts with the color film layer 23. Specifically, as shown in FIG. 3, the display panel 20 includes a first substrate 21, a second substrate 22, and a color film layer 23. The first substrate 21 is disposed opposite to the second substrate 22, and the color film layer 23 is located between the first substrate 21 and the second substrate 22. The grating layer 30 is located between the color film layer 23 and the second substrate 22, and the grating layer 30 contacts with the color film layer 23. With such design, the incident light incident on the grating layer 30 is the exit light from the color film layer 23. Since the grating layer 30 contacts with the color film layer 23, the exit light from the color film layer 23 may not be mixed before being incident to the grating layer 30. Therefore, it may prevent the exit light from the color film layer 23 from being mixed and lowering the effect of the control of the grating layer 30 on the propagation of the light within the display device 10.

In the above embodiment, the grating layer 30 may be provided outside the display panel 20. For example, the display device 10 is a liquid crystal display device including a back light source and a display panel 20 located on the light exit side of the back light source. The back light source provides a surface light source for the display panel 20. The grating layer 30 may be disposed at the light exit side of the back light source and contacts with the back light source. The light from the surface light source provided by the back light source is incident to the display panel 20 after passing through the grating layer 30.

When producing the display device 10 provide by the above embodiments, the production method of the grating layer 30 may be various. For example, the grating layer 30 may be produced with a nanoimprint process or a laser interference process.

In the description of the above embodiments, the particular features, structures, materials, or characteristics may be combined in one or more embodiments or examples in any suitable manner.

Described above is only the specific embodiments of the present disclosure, and the protection scope of the present disclosure is not limited thereto. Those skilled in the art may readily conceive modification or replacement within the technical scope provided by the present disclosure, and should be covered by the protection scope of the present disclosure. Therefore, the protection scope of the present disclosure is subject to the protection scope of the claims.

What is claimed is:

1. A display device, comprising: a display panel and a grating layer disposed inside the display panel or outside the display panel, wherein
   the display panel comprises a plurality of R pixels, a plurality of G pixels and a plurality of B pixels, the grating layer comprises a R grating region corresponding to the R pixel, a G grating region corresponding to the G pixel, and a B grating region corresponding to the B pixel;
   along a direction from a center of a central area of a view field of the display device to a non-central area of the view field of the display device, each of a grating period of the R grating region, a grating period of the G grating region, and a grating period of the B grating region gradually decreases; and
   light emitted from a position of the display device corresponding to the R pixel, light emitted from a position of the display device corresponding to the G pixel and light emitted from a position of the display device corresponding to the B pixel are emitted respectively along a straight line formed by the position of the R pixel and a viewer, a straight line formed by the position of the G pixel and the viewer and a straight line formed by the position of the B pixel and the viewer.

2. The display device according to claim 1, wherein the center of the central area of the view field corresponds to a center of the display device, and along a lateral direction of the display device, from the center of the display device to either side of the display device, each of the grating period of the R grating region, the grating period of the G grating region, and the grating period of the B grating region gradually decreases.

3. The display device according to claim 1, wherein the center of the central area of the view field corresponds to a center of the display device, and along a longitudinal direction of the display device, from the center of the display device to either side of the display device, each of the grating period of the R grating region, the grating period of the G grating region, and the grating period of the B grating region gradually decreases.

4. The display device according to claim 1, wherein the center of the central area of the view field corresponds to a center of the display device, along a longitudinal direction of the display device, from the center of the display device to either side of the display device, each of the grating period of the R grating region, the grating period of the G grating region, and the grating period of the B grating region gradually decreases; and along a lateral direction of the display device, from the center of the display device to either side of the display device, each of the grating period of the R grating region, the grating period of the G grating region, and the grating period of the B grating region gradually decreases.

5. The display device according to claim 1, wherein
   along a lateral direction of the display device, the display device comprises a plurality of R pixel columns, a plurality of G pixel columns and a plurality of B pixel columns,
   the plurality of R pixel columns, the plurality of G pixel columns and the plurality of B pixel columns are arranged alternatingly,
   the R pixel column is formed by a plurality of R pixels arranged along a longitudinal direction of the display device,
   the G pixel column is formed by a plurality of G pixels arranged along the longitudinal direction of the display device, and
   the B pixel column is formed by a plurality of B pixels arranged along the longitudinal direction of the display device.

6. The display device according to claim 1, wherein
   along a longitudinal direction of the display device, the display device comprises a plurality of R pixel rows, a plurality of G pixel rows and a plurality of B pixel rows,
   the plurality of R pixel rows, the plurality of G pixel rows and the plurality of B pixel rows are arranged alternatingly,
   the R pixel row is formed by a plurality of R pixels arranged along a lateral direction of the display device,
   the G pixel row is formed by a plurality of G pixels arranged along the lateral direction of the display device, and
   the B pixel row is formed by a plurality of B pixels arranged along the lateral direction of the display device.

7. The display device according to claim 1, wherein
   along at least one of a lateral direction of the display device and a longitudinal direction of the display device, the R pixels, the G pixels and the B pixels are arranged alternatingly.

8. The display device according to claim 1, wherein the grating layer comprises a plurality of grating protrusions, the grating protrusion is a stripe-shaped grating protrusion and extends along the longitudinal direction of the display device, and the plurality of grating protrusions are arranged in parallel along the lateral direction of the display device.

9. The display device according to claim 1, wherein the grating layer comprises a plurality of grating protrusions, the grating protrusion is a stripe-shaped grating protrusion and extends along the lateral direction of the display device, and the plurality of grating protrusions are arranged in parallel along the longitudinal direction of the display device.

10. The display device according to claim 1, wherein the viewer watches a frame displayed by the display device, the frame is projected on a virtual screen behind the display device, the virtual screen is a curved-surface virtual screen and has a circle center, and the viewer is located at the circle center of the virtual screen.

11. The display device according to claim 1, wherein the viewer watches a frame displayed by the display device, the frame is projected on a virtual screen behind the display device, the virtual screen is a curved-surface virtual screen and has a circle center, and the viewer is located at a side of the circle center of the virtual screen adjacent to the virtual screen.

12. The display device according to claim 1, wherein the viewer watches a frame displayed by the display device, the frame is projected on a virtual screen behind the display device, the virtual screen is a curved-surface virtual screen and has a circle center, and the display device is located at a side of the circle center of the virtual screen away from the virtual screen.

13. The display device according to claim 1, wherein
the grating layer comprises a plurality of grating protrusions,
the grating protrusion located within a region corresponding to the central area of the view field has a thickness $h_A$ satisfying:

$$h_A = \frac{m_A \lambda}{|n_{GA} - n_{SA}|}$$

where $n_{GA}$ denotes a refractive index of the grating protrusion located in the region corresponding to the central area of the view field, $n_{SA}$ denotes a refractive index of filling material inside a gap between two adjacent grating protrusions located in the region corresponding to the central area of the view field, $\lambda$ denotes a wavelength of incident light incident on the grating layer, $m_A$ denotes a first constant which satisfies: $i-\frac{1}{2} < m_A < i+\frac{1}{2}$, $i=1, 2, 3, 4 \ldots$ ; and
the grating protrusion located within a region corresponding to the non-central area of the view field has a thickness $h_B$ satisfying:

$$h_B = \frac{m_B \lambda}{|n_{GB} - n_{SB}|}$$

where $n_{GB}$ denotes a refractive index of the grating protrusion located in the region corresponding to the non-central area of the view field, $n_{SB}$ denotes a refractive index of filling material inside a gap between two adjacent grating protrusions located in the region corresponding to the non-central area of the view field, $\lambda$ denotes a wavelength of incident light incident on the grating layer, $m_B$ denotes a second constant which satisfies: $m_B = j + \frac{1}{2}$, $j=0, 1, 2, 3, 4 \ldots$ 14. The display device according to claim 13, wherein $n_{GA} > n_{SA}$; and $n_{GB} > n_{SB}$.

15. The display device according to claim 14, wherein $n_{GA} = n_{GB} = 1.5$, $n_{SA} = n_{SB} = 1$.

16. The display device according to claim 13, wherein $0.5 < m_A < 1.5$; $m_B = 0.5$.

17. The display device according to claim 13, wherein
within the region corresponding to the central area of the view field, a thickness $h_{AR}$ of the grating protrusion of the R grating region satisfies: $315 \text{ nm} < h_{AR} < 945 \text{ nm}$, a thickness $h_{AG}$ of the grating protrusion of the G grating region satisfies: $275 \text{ nm} < h_{AG} < 825 \text{ nm}$, and a thickness $h_{AB}$ of the grating protrusion of the B grating region satisfies: $215 \text{ nm} < h_{AB} < 645 \text{ nm}$; and
within the region corresponding to the non-central area of the view field, a thickness $h_{BR}$ of the grating protrusion of the R grating region is 630 nm, a thickness $h_{BG}$ of the grating protrusion of the G grating region is 550 nm, and a thickness $h_{BB}$ of the grating protrusion of the B grating region is 430 nm.

18. The display device according to claim 1, wherein
within a region corresponding the central area of the view field, a grating duty ratio $dc_A$ of the grating layer satisfies: $0.2 \leq dc_A \leq 0.8$; and
within a region corresponding the non-central area of the view field, a grating duty ratio $dc_B$ of the grating layer is 0.5.

19. The display device according to claim 1, wherein an incident angle of incident light incident on the grating layer is 0°.

20. The display device according to claim 1, wherein the grating protrusion of the grating layer is a transparent grating protrusion.

* * * * *